(12) United States Patent
Tanaka et al.

(10) Patent No.: US 12,533,382 B2
(45) Date of Patent: Jan. 27, 2026

(54) COMPOSITE INCLUDING NEURAL RETINA, RETINAL PIGMENT EPITHELIAL CELLS, AND HYDROGEL, AND METHOD FOR PRODUCING SAME

(71) Applicants: Riken, Saitama (JP); Racthera Co., Ltd., Tokyo (JP)

(72) Inventors: Yuji Tanaka, Wako (JP); Michiko Mandai, Wako (JP); Masayo Takahashi, Wako (JP); Suguru Yamasaki, Kobe (JP)

(73) Assignees: Riken, Saitama (JP); Racthera Co., Ltd., Tokyo (JP)

( * ) Notice: Subject to any disclaimer, the term of this patent is extended or adjusted under 35 U.S.C. 154(b) by 1114 days.

(21) Appl. No.: 17/605,573

(22) PCT Filed: Apr. 24, 2020

(86) PCT No.: PCT/JP2020/017635
§ 371 (c)(1),
(2) Date: Oct. 21, 2021

(87) PCT Pub. No.: WO2020/218480
PCT Pub. Date: Oct. 29, 2020

(65) Prior Publication Data
US 2022/0249572 A1 Aug. 11, 2022

(30) Foreign Application Priority Data
Apr. 26, 2019 (JP) ................................ 2019-086199

(51) Int. Cl.
| | |
|---|---|
| A61K 35/30 | (2015.01) |
| A61K 47/42 | (2017.01) |
| A61L 27/22 | (2006.01) |
| A61L 27/38 | (2006.01) |
| A61L 27/52 | (2006.01) |
| A61P 27/02 | (2006.01) |

(52) U.S. Cl.
CPC .............. *A61K 35/30* (2013.01); *A61K 47/42* (2013.01); *A61L 27/22* (2013.01); *A61L 27/383* (2013.01); *A61L 27/52* (2013.01); *A61P 27/02* (2018.01)

(58) Field of Classification Search
CPC ..... A61K 35/30; A61L 27/52; A61L 2430/16; A61L 27/3604
See application file for complete search history.

(56) References Cited

U.S. PATENT DOCUMENTS

| | | |
|---|---|---|
| 2011/0004304 A1 | 1/2011 | Tao et al. |
| 2020/0206387 A1 | 7/2020 | Takahashi et al. |
| 2021/0317403 A1 | 10/2021 | Valeria Canto-Soler et al. |

FOREIGN PATENT DOCUMENTS

| | | |
|---|---|---|
| CN | 1720055 A | 1/2006 |
| CN | 102204930 A | 10/2011 |
| CN | 102258808 A | 11/2011 |
| CN | 103007355 A | 4/2013 |
| CN | 107109367 A | 8/2017 |
| EP | 2265711 | 12/2010 |
| WO | 98/22029 A1 | 5/1998 |
| WO | 2004/033635 A2 | 4/2004 |
| WO | 2005/070011 A2 | 8/2005 |
| WO | 2006/080952 A2 | 8/2006 |
| WO | 2009/127809 A1 | 10/2009 |
| WO | 2011/055855 A1 | 5/2011 |
| WO | 2011/063005 A2 | 5/2011 |
| WO | 2012/173207 A1 | 12/2012 |
| WO | 2013/077425 A1 | 5/2013 |
| WO | 2015/025967 A1 | 2/2015 |
| WO | 2015/053375 A1 | 4/2015 |
| WO | 2015/053376 A1 | 4/2015 |
| WO | 2015/068505 A1 | 5/2015 |
| WO | 2016/063985 A1 | 4/2016 |
| WO | 2016/063986 A1 | 4/2016 |
| WO | 2017/043605 A1 | 3/2017 |
| WO | 2017/183732 A1 | 10/2017 |
| WO | 2018/089515 A1 | 5/2018 |
| WO | 2019/050015 A1 | 3/2019 |

OTHER PUBLICATIONS

Seiler MJ, Aramant RB. Intact sheets of fetal retina transplanted to restore damaged rat retinas. Invest Ophthalmol Vis Sci. Oct. 1998;39(11):2121-31. PMID: 9761291. (Year: 1998).*
Rose JB, Pacelli S, Haj AJE, Dua HS, Hopkinson A, White LJ, Rose FRAJ. Gelatin-Based Materials in Ocular Tissue Engineering. Materials (Basel). Apr. 17, 2014;7(4):3106-3135. doi: 10.3390/ma7043106. PMID: 28788609; PMCID: PMC5453355. (Year: 2014).*
Lim LT, Ah-Kee EY, Collins CE. Common eye drops and their implications for pH measurements in the management of chemical eye injuries. Int J Ophthalmol. Dec. 18, 2014;7(6):1067-8. doi: 10.3980/j.issn.2222-3959.2014.06.29. PMID: 25540767; PMCID: PMC4270978. (Year: 2014).*
WO 2015025967 A1—English translation (Year: 2014).*
Kuwahara et al., , "Generation of a ciliary margin-like stem cell niche from self-organizing human retinal tissue," Nature Communications, 6: 6286 (2015).
Taylor et al., "The epidemiology of infection in trachoma," Investigative Ophthalmology & Visual Science, 30 (8): 1823-1833 (1989).
M'Barek et al., "Human ESC-derived retinal epithelial cell sheets potentiate rescue of photoreceptor cell loss in rats with retinal degeneration," Science Translational Medicine, 9 (421): 1-12 (2017).
Seiler et al., "Cell replacement and visual restoration by retinal sheet transplants," Progress in Retinal Eye Research, 31(6): 661-687 (2012).
Lamba et al., "Generation, Purification and Transplantation of Photoreceptors Derived from Human Induced Pluripotent Stem Cells," PLoS One, 5 (1): e8763 (2010).
Meyer et al., "Optic Vesicle-like Structures Derived from Human Pluripotent Stem Cells Facilitate a Customized Approach to Retinal Disease Treatment," Stem Cells, 29 (8): 1206-1218 (2011).

(Continued)

*Primary Examiner* — Fereydoun G Sajjadi
*Assistant Examiner* — Qinhua Gu
(74) *Attorney, Agent, or Firm* — Morgan, Lewis & Bockius LLP

(57) ABSTRACT

Provided is a composite comprising a neural retina, a retinal pigment epithelial cell sheet, and a hydrogel.

14 Claims, 21 Drawing Sheets

(56) References Cited

OTHER PUBLICATIONS

Reichman et al., "From confluent human iPS cells to self-forming neural retina and retinal pigmented epithelium", PNAS, 111 (23): 8518-8523 (2014).
Zhong et al., "Generation of three dimensional retinal tissue with functional photoreceptors from human iPSCs", Nature Communications, 5: 4047 (2015).
Kamao et al., "Characterization of human induced pluripotent stem cell-derived retinal pigment epithelium cell sheets aiming for clinical application," Stem Cell Reports, 2(2): 205-218 (2014).
Nakano et al., "Self-Formation of Optic Cups and Storable Stratified Neural Retina from Human ESCs," Cell Stem Cell, 10 (6): 771-785 (2012).
Haruta et al., "In Vitro and In Vivo Characterization of Pigment Epithelial Cells Differentiated from Primate Embryonic Stem Cells," Investigative Ophthalmology & Visual Science, 45 (3): 1020-1025 (2004).
Okamoto et al., "Induction of Retinal Pigment Epithelial Cells from Monkey iPS Cells," Investigative Ophthalmology & Visual Science, 52 (12): 8785-8790 (2011).
Osakada et al., "In vitro differentiation of retinal cells from human pluripotent stem cells by small-molecule induction", Cell Science, 122 (17): 3169-3179 (2009).
Gamm et al., "A Novel Serum-Free Method for Culturing Human Prenatal Retinal Pigment Epithelial Cells," Investigative Ophthalmology & Visual Science, 49 (2): 788-799 (2008).
Nakagawa et al., "A novel efficient feeder-free culture system for the derivation of human induced pluripotent stem cells," Scientific Reports, 4: 3594 (2014).
Aramant et al, "Successful cotransplantation of intact sheets of fetal retina with retinal pigment epithelium," Investigative Ophthalmology & Visual Science, 40 (7): 1557-1564 (1999).
Tu et al., "Medium- to long-term survival and functional examination of human iPSC-derived retinas in rat and primate models of retinal degeneration," EBioMedicine, 39: 562-574 (2018).
Arakawa et al., "Development of novel therapies using human iPS cell-derived retinal pigment epithelia," Folia Pharmacologica Japonica, 148: 217 (2016).
Akiba et al., "Toward establishment of regenerative cell Full therapy for retinitis pigmentosa using iPS cell derived retinal sheet," Folia Pharmacologica Japonica, 155: 93-98 (2020).
International Search Report issued in corresponding International Patent Application No. PCT/JP2020/017635 dated Jun. 30, 2020.
International Preliminary Report on Patentability and Written Opinion issued in corresponding International Patent Application No. PCT/JP2020/017635 dated Nov. 4, 2021.

* cited by examiner (1)

(2)

(3)

(4)

DAPI CRX::Venus    RPE65

(B)

CRX::Venus  Stem121  RPE65

DAPI HuNu (B)

HuNu MITF

DAPI HuNu MITF Iba-1

(B)

DAPI Iba-1

(A)

(B)

COMPOSITE INCLUDING NEURAL RETINA, RETINAL PIGMENT EPITHELIAL CELLS, AND HYDROGEL, AND METHOD FOR PRODUCING SAME

TECHNICAL FIELD

The present invention relates to a composite comprising a neural retina, a retinal pigment epithelial cell sheet, and a hydrogel and a method for producing the same.

BACKGROUND ART

When photoreceptor cells and retinal pigment epithelial (RPE) cells are simultaneously in disorder in advanced age-related macular degeneration, etc., the simultaneous transplantation of a neural retina (NR) and retinal pigment epithelial (RPE) cells is reportedly desirable.

In relation to transplantation therapy with retinas for diseases caused by the disorder of retinal tissues, such as retinitis pigmentosa, research is actively ongoing on methods for producing neural retinas or retinal pigment epithelial (RPE) cells from pluripotent stem cells. For example, methods of obtaining a neural retina by the suspension culture of an aggregate of pluripotent stem cells in a culture medium containing a BMP signaling pathway agonist (Patent Literatures 1 and 2 and Non Patent Literature 1) are known as methods for producing a neural retina from pluripotent stem cells. Also, for example, a method for obtaining RPE cells from retinal precursor cells induced in a culture medium containing a retinoic acid receptor antagonist (Patent Literature 3) is known as a method for producing RPE cells from pluripotent stem cells. However, any method for producing a retinal tissue containing both of separately prepared NR and RPE cells in a condition in which both the NR and the RPE cells are correctly localized with the same orientation as that in a retinal tissue in a retina in vivo has not yet been known.

Meanwhile, techniques using gelatin in transplantation have been studied so far. Examples thereof include a method of solidifying a retinal tissue in vivo in gelatin in order to improve the ease of dissection in dissecting a photoreceptor layer (Non Patent Literature 2), a method of embedding a retinal tissue in vivo in temperature-sensitive gelatin (Non Patent Literature 3), and a method of embedding a human fetus-derived retinal tissue in gelatin in order to protect a fragile fetal tissue (Non Patent Literature 4).

CITATION LIST

Patent Literature

Patent Literature 1: International Publication No. WO2015/025967
Patent Literature 2: International Publication No. WO2016/063986
Patent Literature 3: International Publication No. WO2012/173207

Non Patent Literature

Non Patent Literature 1: Kuwahara A. et al., "Generation of a ciliary margin-like stem cell niche from self-organizing human retinal tissue", Nature Communications, 6, 6286 (2015)
Non Patent Literature 2: Taylor et al., "The epidemiology of infection in trachoma." IOVS 1989 August; Volume 30, Issue 8, p 1823-1833
Non Patent Literature 3: M'Barek et al., "Human ESC-derived retinal epithelial cell sheets potentiate rescue of photoreceptor cell loss in rats with retinal degeneration", Sci. Transl. Med. 2017 December; Volume 9, Issue 421
Non Patent Literature 4: Seiler et al., "Cell replacement and visual restoration by retinal sheet transplants", Prog Retin Eye Res. 2012 November; 31(6):661-687

SUMMARY OF INVENTION

Technical Problem

As a result of conducting studies, the present inventors have found the problem of a composite comprising a neural retina and a retinal pigment epithelial cell sheet embedded in a hydrogel, which disrupts easily in the process of operations up to transplantation so that a composite suitable for transplantation cannot be produced, because the neural retina and the retinal pigment epithelial cell sheet are separated in producing the composite. The studies of the present inventors have also revealed that in producing a composite comprising a neural retina and a retinal pigment epithelial cell sheet embedded in a hydrogel, cells are damaged by physical contact when the separately produced neural retina and retinal pigment epithelial cell sheet are contacted each other for a long time.

On the other hand, it is preferable that the hydrogel should be rapidly dissolved, degraded and absorbed after transplantation from the viewpoint that difficulty in degrading the hydrogel hinders the interaction between the transplanted neural retina and RPE cells transplanted simultaneously therewith or RPE cells of a host or mass transfer between these cells.

Accordingly, in light of these circumstances, an object of the present invention is to provide a composite of a neural retina and a retinal pigment epithelial cell sheet suitable for transplantation and a method for producing the same.

Solution to Problem

As a result of conducting diligent studies, the present inventors have found that the solidification of a hydrogel having a melting point close to a body temperature at a high concentration under low-temperature conditions facilitates handling a composite of a neural retina and a retinal pigment epithelial cell sheet and can provide a retinal tissue suitable for transplantation. Particularly, the present inventors have found that the interposition of the hydrogel between the neural retina and the retinal pigment epithelial cell sheet and around them can prevent cell damage, facilitates handling the composite of the neural retina and the retinal pigment epithelial cell sheet, and can provide a retinal tissue suitable for transplantation, completing the present invention.

That is, the present invention relates to the following.

[1]

A composite comprising a neural retina, a retinal pigment epithelial cell sheet, and a hydrogel, wherein
each of the neural retina and the retinal pigment epithelial cell sheet is derived from a human pluripotent stem cell;
in the neural retina, a neural retinal layer including at least a photoreceptor layer is formed, wherein the photoreceptor layer comprises at least one or more cells selected from the group consisting of a photoreceptor cell, a photoreceptor precursor cell and a retinal precursor cell;

the melting point of the hydrogel is from 20° C. to 40° C.; and the whole of the neural retina and the retinal pigment epithelial cell sheet is embedded in the hydrogel, the tangent directions of the respective surfaces of the neural retina and the retinal pigment epithelial cell sheet are approximately parallel, the apical surface of the neural retina and the apical surface of the retinal pigment epithelial cell sheet face each other, and the neural retina and the retinal pigment epithelial cell sheet are separated by the hydrogel from each other without contact.

[2]

The composite according to [1], wherein the jelly strength of the hydrogel is from 1000 g to 2000 g.

[3]

The composite according to [1] or [2], wherein the concentration of the hydrogel is from 10% to 50% by weight.

[4]

The composite according to any of [1] to [3], wherein the pH of the hydrogel is from 6.5 to 7.5.

[5]

The composite according to any of [1] to [4], wherein the hydrogel has biodegradability.

[6]

The composite according to any of [1] to [5], wherein the hydrogel is a hydrogel of gelatin.

[7]

The composite according to [6], wherein the gelatin is alkali-treated and/or heat-treated gelatin.

[8]

The composite according to any of [1] to [7], wherein the neural retina is a neural retina obtained from a cell aggregate obtained by differentiating a human pluripotent stem cell, the cell aggregate comprises at least a first epithelial tissue and a second epithelial tissue, wherein the first epithelial tissue contains a human neural retina, and the second epithelial tissue has the continuity of the slope of a tangent line to a surface different from the continuity of the slope of a tangent line to the surface of the first epithelial tissue, and contains a cell other than a retinal cell and/or a retinal pigment epithelial cell, and the neural retina contains a region on the first epithelial tissue most distant from the second epithelial tissue in the cell aggregate.

[9]

A method for producing a composite comprising a neural retina, a retinal pigment epithelial cell sheet, and a hydrogel, wherein each of the neural retina and the retinal pigment epithelial cell sheet is derived from a human pluripotent stem cell;

in the neural retina, a neural retinal layer including at least a photoreceptor layer is formed, wherein the photoreceptor layer comprises at least one or more cells selected from the group consisting of a photoreceptor cell, a photoreceptor precursor cell and a retinal precursor cell; and the melting point of the hydrogel is from 20° C. to 40° C., the method comprising:

(1) a first step of loading either one of the retinal pigment epithelial cell sheet and the neural retina in a container;

(2) a second step of adding a hydrogel in a fluid state to the container loaded with the either one of the retinal pigment epithelial cell sheet and the neural retina;

(3) a third step of solidifying the hydrogel by cooling so as to embed the whole of the either one of the retinal pigment epithelial cell sheet and the neural retina to form a first hydrogel layer having the either one of the retinal pigment epithelial cell sheet and the neural retina and the hydrogel;

(4) a fourth step of further loading the other of the retinal pigment epithelial cell sheet and the neural retina on the first hydrogel layer such that the tangent directions of the respective surfaces of the either one of the retinal pigment epithelial cell sheet and the neural retina in the first hydrogel layer and the other of the retinal pigment epithelial cell sheet and the neural retina are approximately parallel and the apical surface of the neural retina and the apical surface of the retinal pigment epithelial cells face each other;

(5) a fifth step of adding a hydrogel in a fluid state to the container further loaded with the other of the retinal pigment epithelial cell sheet and the neural retina; and (6) a sixth step of solidifying the hydrogel by cooling so as to embed the whole of the first hydrogel layer and the other of the retinal pigment epithelial cell sheet and the neural retina to form a second hydrogel layer having the first hydrogel layer, the other of the retinal pigment epithelial cell sheet and the neural retina, and the hydrogel.

[10]

The production method according to [9], wherein in the third step, cooling to 2° C. to 8° C. is performed.

[11]

The production method according to [9] or [10], wherein in the sixth step, cooling to 2° C. to 8° C. is performed.

[12]

The production method according to any of [9] to [11], further comprising, after the sixth step, (7) a seventh step of preserving the composite at from 10° C. to 20° C.

[13]

The production method according to any of [9] to [12], wherein the jelly strength of the hydrogel is from 1000 g to 2000 g.

[14]

The production method according to any of [9] to [13], wherein the concentration of the hydrogel is from 10% to 50% by weight.

[15]

The production method according to any of [9] to [14], wherein the pH of the hydrogel is from 6.5 to 7.5.

[16]

The production method according to any of [9] to [15], wherein the hydrogel has biodegradability.

[17]

The production method according to any of [9] to [16], wherein the hydrogel is a hydrogel of gelatin.

[18]

The production method according to [17], wherein the gelatin is alkali-treated and/or heat-treated gelatin.

[19]

The production method according to any of [9] to [18], wherein the neural retina is a neural retina obtained from a cell aggregate obtained by differentiating a human pluripotent stem cell, the cell aggregate comprises at least a first epithelial tissue and a second epithelial tissue, wherein the first epithelial tissue contains a human neural retina, and the second epithelial tissue has the continuity of the slope of a tangent line to a surface different from the continuity of the slope of a tangent line to the surface of the first epithelial tissue, and contains a cell other than a retinal cell and/or a retinal pigment epithelial cell, and the neural retina contains a region on the first epithelial tissue most distant from the second epithelial tissue in the cell aggregate.

[20]

A pharmaceutical composition comprising the composite according to any of [1] to [8] as an active ingredient.

[21]

A therapeutic medication for a disease caused by a disorder of a retinal tissue or a damage of a retinal tissue, comprising the composite according to any of [1] to [8].

[22]

A composition for transplantation comprising the composite according to any of [1] to [8].

[23]

The composition for transplantation according to [22], wherein the composition for transplantation is to be transplanted to the eye fundus or into the subretinal space in a patient.

[24]

The composition for transplantation according to [23], wherein the composition for transplantation is to be transplanted such that the composite is engrafted in the recipient patient in a condition in which the neural retina of the transplanted composite faces the neural retinal layer of the patient while the retinal pigment epithelial cell sheet of the transplanted composite faces the retinal pigment epithelial layer of the patient.

[25]

A method for treating a disease caused by a disorder of a retinal tissue or a damage of a retinal tissue, comprising the steps of:
 (1) transplanting the composite according to any of [1] to [8] to the eye fundus or into the subretinal space in a patient; and
 (2) engrafting the composite in vivo in the patient in a condition in which the neural retina of the transplanted composite faces the neural retinal layer of the patient while the retinal pigment epithelial cell sheet of the transplanted composite faces the retinal pigment epithelial layer of the patient.

Advantageous Effects of Invention

The present invention can provide a composite of a neural retina and a retinal pigment epithelial cell sheet suitable for transplantation and a method for producing the same.

DESCRIPTION OF EMBODIMENTS

Definition

Figure 1:
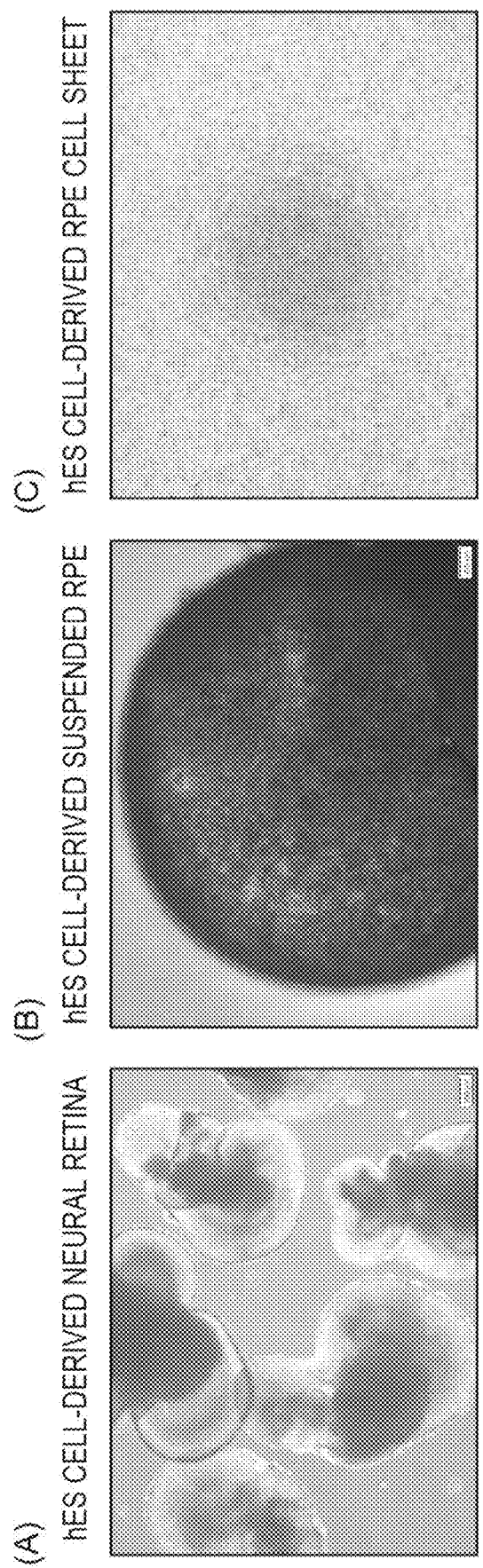
FIG. 1 is images showing results of microscopically observing a hES cell-derived neural retina (A), hES cell-derived suspended RPE (B), and a hES cell-derived RPE cell sheet (C) in Example 1.

The "stem cells" refer to undifferentiated cells having differentiation potency and proliferation potency (particularly, self-renewal ability). In the stem cells, subgroups of pluripotent stem cells, multipotent stem cells and unipotent stem cells, are included according to the differentiation potency. The pluripotent stem cells refer to stem cells that can be cultured in vitro and has an ability (pluripotency) to be able to differentiate into three germ layers (ectoderm, mesoderm, endoderm) and/or all cell lineages belonging to the extraembryonic tissue. The multipotent stem cells refer to stem cells having an ability to differentiate into a plurality of tissues or cells, although the definition is not applied to all of them. The unipotent stem cells refer to stem cells having an ability to be able to differentiate into a predetermined tissue or cells.

The "pluripotent stem cells" can be induced from, e.g., a fertilized egg, a cloned embryo, germline stem cells, tissue stem cells and somatic cells. Examples of the pluripotent stem cells can include embryonic stem cells (ES cells), embryonic germ cells (EG cells) and induced pluripotent stem cells (iPS cells). Muse cells (Multi-lineage differentiating stress enduring cells) obtained from the mesenchymal stem cells (MSC) and GS cells prepared from germ cells (for example, testis) are included in the pluripotent stem cells.

Human embryonic stem cells were established in 1998 and have been used also for regenerative medicine. The embryonic stem cells can be produced by culturing inner cell aggregate on feeder cells or a culture medium containing bFGF. The method for producing embryonic stem cells is described, for example, in WO96/22362, WO02/101057, U.S. Pat. Nos. 5,843,780, 6,200,806, 6,280,718. The embryonic stem cells are available from a predetermined institution and also, commercially available. For example, human embryonic stem cells such as KhES-1, KhES-2 and KhES-3 are available from the Institute for Frontier Life and Medical Sciences, Kyoto University. Human embryonic stem cells such as Crx::Venus strain (derived from KhES-1) are available from RIKEN.

The "induced pluripotent stem cells" refers to cells having pluripotency, which is induced by reprogramming somatic cells by a method known in the art.

The induced pluripotent stem cells were established in mouse cells by Yamanaka et al., in 2006 (Cell, 2006, 126 (4), pp. 663-676). The induced pluripotent stem cells were also established in human fibroblasts in 2007. The induced pluripotent stem cells have pluripotency and self-renewal ability similarly to embryonic stem cells (Cell, 2007, 131 (5), pp. 861-872; Science, 2007, 318 (5858), pp. 1917-1920; Nat. Biotechnol., 2008, 26 (1), pp. 101-106).

The induced pluripotent stem cells more specifically refer to cells which are induced to be pluripotent by reprogramming somatic cells differentiated into, for example, fibroblasts and peripheral blood mononuclear cells, by allowing any one of sets of a plurality of genes selected from a reprogramming gene group containing Oct3/4, Sox2, Klf4, Myc (c-Myc, N-Myc, L-Myc), Glis1, Nanog, Sall4, lin28 and Esrrb to express. Examples of a preferable set of reprogramming factors may include (1) Oct3/4, Sox2, Klf4, and Myc (c-Myc or L-Myc) and (2) Oct3/4, Sox2, Klf4, Lin28 and L-Myc (Stem Cells, 2013; 31: 458-466).

Other than producing induced pluripotent stem cells through direct reprogramming by gene expression, the pluripotent stem cells can be artificially induced from somatic cells, for example, by adding a chemical compound (Science, 2013, 341, pp. 651-654).

Alternatively, an induced pluripotent stem cell strain is available. For example, human induced pluripotent cell strains established by Kyoto University, such as 201B7 cell, 201B7-Ff cell, 253G1 cell, 253G4 cell, 1201C1 cell, 1205D1 cell, 1210B2 cell and 1231A3 cell, are available form Kyoto University and iPS Academia Japan, Inc. As the induced pluripotent stem cells, for example, Ff-I01 cell and Ff-I14 cell established by Kyoto University, are available from Kyoto University.

In the specification, the pluripotent stem cells are preferably embryonic stem cells or induced pluripotent stem cells, more preferably induced pluripotent stem cells.

In the specification, the pluripotent stem cells are human pluripotent stem cells, preferably human induced pluripotent stem cells (iPS cells) or human embryonic stem cells (ES cells).

Pluripotent stem cells such as human iPS cells can be subjected to maintenance culture and expansion culture performed by methods known to those skilled in the art.

The "retinal tissue" means a tissue in which a single type or a plurality of types of retinal cells constituting each retinal layer in a retina in vivo are present according to a predetermined order. The "neural retina" is a retinal tissue and means a tissue containing an inside neural retinal layer that does not contain a retinal pigment epithelial layer among retinal layers mentioned later.

The "retinal cells" mean cells constituting each retinal layer in a retina in vivo or precursor cells thereof. In the retinal cells, cells such as photoreceptor cells (rod photoreceptor cell, cone photoreceptor cell), horizontal cells, amacrine cells, intermediate neuronal cells, retinal ganglion cells (ganglion cell), bipolar cells (rod bipolar cell, cone bipolar cell), Muller glial cells, retinal pigment epithelial (RPE) cells, ciliary marginal zone cells, their precursor cells (e.g., photoreceptor precursor cell, bipolar precursor cell), and retinal precursor cells are included, though not limited thereto. Among the retinal cells, examples of cells constituting a neural retinal layer specifically include cells such as photoreceptor cells (rod photoreceptor cell, cone photoreceptor cell), horizontal cells, amacrine cells, intermediate neuronal cells, retinal ganglion cells (ganglion cell), bipolar cells (rod bipolar cell, cone bipolar cell), Muller glial cells, and their precursor cells (e.g., photoreceptor precursor cell, bipolar precursor cell).

The "matured retinal cells" mean cells that may be contained in the retinal tissue of a human adult, and specifically mean differentiated cells such as photoreceptor cells (rod photoreceptor cell, cone photoreceptor cell), horizontal cells, amacrine cells, intermediate neuronal cells, retinal ganglion cells (ganglion cell), bipolar cells (rod bipolar cell, cone bipolar cell), Muller glial cells, retinal pigment epithelial (RPE) cells, and ciliary marginal zone cells. The "immature retinal cells" mean precursor cells (e.g., photoreceptor precursor cell, bipolar precursor cell, retinal precursor cell) destined for differentiation into matured retinal cells.

The photoreceptor precursor cells, the horizontal precursor cells, the bipolar precursor cells, the amacrine precursor cells, the retinal ganglion precursor cells, the Muller glial precursor cells, and the retinal pigment epithelial precursor cells refer to precursor cells destined for differentiation into photoreceptor cells, horizontal cells, bipolar cells, amacrine cells, retinal ganglion cells, Muller glial cells, and retinal pigment epithelial cells, respectively.

The "retinal precursor cells" are precursor cells capable of differentiating into any one of the immature retinal cells such as photoreceptor precursor cells, horizontal precursor cells, bipolar precursor cells, amacrine precursor cells, retinal ganglion precursor cells, Muller glial cells, and retinal pigment epithelial precursor cells, and refer to precursor cells also capable of eventually differentiating into any one of the matured retinal cells such as photoreceptor cells, rod photoreceptor cells, cone photoreceptor cells, horizontal cells, bipolar cells, amacrine cells, retinal ganglion cells, and retinal pigment epithelial cells.

The "photoreceptor cells" are present in the photoreceptor layer of a retina and plays a role in absorbing light stimuli and converting them to electrical signals. The photoreceptor cells have two types, cones which function in the light and rods which function in the dark. The photoreceptor cells are matured after differentiation from photoreceptor precursor cells. Whether or not cells are photoreceptor cells or photoreceptor precursor cells can be readily confirmed by those skilled in the art, for example, through the expression of cell markers (Crx and Blimp1 expressed in photoreceptor precursor cells, recoverin expressed in photoreceptor cells, rhodopsin, S-opsin and M/L-opsin expressed in mature photoreceptor cells, etc.) mentioned later or the formation of an outer segment structure. In an embodiment, the photoreceptor precursor cells are Crx-positive cells, and the photoreceptor cells are rhodopsin-, S-opsin- and M/L-opsin- positive cells.

The presence of retinal cells can be confirmed from the presence or absence of expression of a marker of retinal cells (hereinafter, also referred to as "retinal cell marker"). The presence or absence of expression of the retinal cell marker, or the ratio of retinal cell marker-positive cells in a cell population or a tissue can be readily confirmed by those skilled in the art. For example, it can be confirmed by dividing the number of predetermined retinal cell marker-positive cells by the total number of cells in accordance with an approach such as flow cytometry or immunostaining using a commercially available antibody.

Examples of the retinal cell marker include Rx (also referred to as Rax) and PAX6 expressed in retinal precursor cells, Rx, PAX6 and Chx10 expressed in neural retinal precursor cells, and Crx and Blimp1 expressed in photoreceptor precursor cells. Examples thereof also include Chx10 strongly expressed in bipolar cells, PKCα, Goα, VSX1 and L7 expressed in bipolar cells, TuJ1 and Brn3 expressed in retinal ganglion cells, calretinin and HPC-1 expressed in amacrine cells, calbindin expressed in horizontal cells, recoverin expressed in photoreceptor cells and photoreceptor precursor cells, rhodopsin expressed in rod cells, Nrl expressed in rod photoreceptor cells and rod photoreceptor precursor cells, S-opsin and L/M-opsin expressed in cone photoreceptor cells, RXR-γ expressed in cone cells, cone photoreceptor precursor cells and ganglion cells, TRβ2, OTX2 and OC2 expressed in cone photoreceptor cells that appear at the early phase of differentiation among cone photoreceptor cells, or precursor cells thereof, Pax6 commonly expressed in horizontal cells, amacrine cells and ganglion cells, RPE65 and Mitf expressed in retinal pigment epithelial cells, and CRALBP expressed in Muller cells.

The "positive cells" mean cells expressing a predetermined marker on the cell surfaces or within the cells. For example, the "Chx10-positive cells" mean cells expressing Chx10 protein.

The "retinal pigment epithelial cells" mean epithelial cells present outside the neural retina in a retina in vivo. Whether or not cells are retinal pigment epithelial cells can be readily confirmed by those skilled in the art, for example, through the expression of cell markers (RPE65, MITF, CRALBP, MERTK, BEST1, etc.) mentioned later, the presence of melanin granules (brown-black), intercellular tight junctions, or polygonal/flagstone-like characteristic cell morphology. Whether or not cells have a function of retinal pigment epithelial cells can be readily confirmed from the ability to secrete cytokines such as VEGF and PEDF. In an embodiment, the retinal pigment epithelial cells are RPE65-positive cells, MITF-positive cells, or RPE65-positive and MITF-positive cells.

The "retinal pigment epithelial cell sheet" means a single-layer or multilayer sheet-like structure constituted by a single or a plurality of cells in which retinal pigment epithelial cells adhere to each other through biological bonds at least in the two-dimensional direction.

The "retinal layer" means individual layers constituting the retina, and examples thereof can specifically include retinal pigment epithelial layer, photoreceptor cell layer, outer limiting membrane, outer nuclear layer, outer plexiform layer, inner nuclear layer, inner plexiform layer, ganglion cell layer, nerve fiber layer and inner limiting membrane.

The "neural retinal layer" means individual layers constituting the neural retina, and examples thereof can specifically include photoreceptor cell layer, outer limiting membrane, outer nuclear layer, outer plexiform layer, inner nuclear layer, inner plexiform layer, ganglion cell layer, nerve fiber layer and inner limiting membrane. The "photoreceptor cell layer" means one of the retinal layers (neural retinal layers) and is a retinal layer that is formed in the outermost of the neural retina and is rich in one or more cells selected from the group consisting of photoreceptor cells (rod photoreceptor cell, cone photoreceptor cell), photoreceptor precursor cells and retinal precursor cells. Which retinal layer the individual cells constitute can be confirmed by a known method, for example, by determining the presence or absence of expression or expression level of a cell marker.

The "cell aggregate" is not particularly limited as long as a plurality of cells mutually adhere to form a three-dimensional structure, and refers to, for example, a mass formed by the aggregation of cells dispersed in a vehicle such as a culture medium, or a mass of cells formed through cell division. In the cell aggregate, the case of forming a predetermined tissue is also included.

The "sphere-like cell aggregate" means a cell aggregate having a stereoscopic shape close to a spherical shape. The stereoscopic shape close to a spherical shape is a shape having a three-dimensional structure, and examples thereof include a spherical shape that exhibits a circle or an ellipse when projected onto a two-dimensional surface, and a shape formed by fusing a plurality of spherical shapes (e.g., which exhibits a shape formed by 2 to 4 circles or ellipses overlapping when two-dimensionally projected). In an embodiment, the core part of the aggregate has a vesicular lamellar structure and is characterized in that the central part is observed to be dark and the outer edge portion is observed to be bright under a bright field microscope.

The "ciliary marginal zone-like structure" is a structure similar to the ciliary marginal zone. Examples of the "ciliary marginal zone (CMZ)" can include a tissue that is present in a boundary region between the neural retina and the retinal pigment epithelium in a retina in vivo, and is a region containing tissue stem cells of the retina (retinal stem cells). The ciliary marginal zone is also called ciliary margin or retinal margin, and the ciliary marginal zone, the ciliary margin and the retinal margin are equivalent tissues. The ciliary marginal zone is known to play an important role in the supply of retinal precursor cells or differentiated cells to retinal tissue, the maintenance of a retinal tissue structure, etc. Examples of a marker gene of the ciliary marginal zone can include Rdh10 gene (positive), Otx1 gene (positive) and Zic1 (positive).

The "apical surface" refers to a surface (upper surface layer) formed on the opposite side to the basal membrane side in which a basal side layer (basal membrane) rich in mucopolysaccharide (positive in PAS staining), rich in laminin and collagen-IV, being 50-100 nm and produced by epithelial cells is present in an epithelia tissue. The "basal membrane" refers to a basal side layer (basal membrane) rich in laminin and collagen-IV, being 50-100 nm and produced by epithelial cells. In an embodiment, in the retinal tissue developed to the extent that photoreceptor cells or photoreceptor precursor cells are observed, it refers to a surface in contact with photoreceptor cell layer (outer nuclear layer) in which outer limiting membrane is formed and photoreceptor cells and photoreceptor precursor cells are present. Such an apical surface can be identified by, for example, immunostaining (known to those skilled in the art) using an antibody against an apical surface marker (e.g., atypical PKC (hereinafter, abbreviated to "aPKC"), E-cadherin, N-cadherin).

The "continuous epithelial tissue" is a tissue having a continuous epithelium structure. The continuous epithelium structure is a structure where the epithelial tissue is continuously formed. The epithelium tissue continuously formed is a condition in which 10 cells to $10^7$ cells, for example, in the tangent direction of the epithelial tissue, preferably 30 cells to $10^7$ cells, further preferably $10^2$ cells to $10^7$ cells, in the tangent direction, are aligned.

For example, in the continuous epithelium structure formed in retinal tissue, the retinal tissue has an apical surface intrinsic to the epithelial tissue. The apical surface is formed almost in parallel to, for example, at least photoreceptor layer (outer nuclear layer) among the layers forming a neural retinal layer and continuously on the surface of the retinal tissue. For example, in the case of a cell aggregate containing retinal tissue prepared from pluripotent stem cells, the apical surface is formed on the surface of the aggregate by regularly and continuously aligning 10 cells or more, preferably 30 cells or more, more preferably 100 cells or more, further preferably 400 cells or more of photoreceptor cells or photoreceptor precursor cells in the tangent direction of the surface.

The "hydrogel" is a polymer cross-linked into a three-dimensional network structure, the inside of which contains an incorporated liquid such as water. Examples of the polymer forming the hydrogel include gelatin, collagen, pectin, hyaluronic acid, and alginic acid. In the specification, specific physical properties, etc. of the "hydrogel" will be described later.

[Composite]

An aspect of the present invention is a composite comprising a neural retina, a retinal pigment epithelial cell sheet, and a hydrogel.

In the composite according to the present invention, the neural retina and the retinal pigment epithelial cell sheet are derived from human pluripotent stem cells. In the composite according to the present invention, each of the neural retina and the retinal pigment epithelial cell sheet is derived from a human pluripotent stem cell. In the neural retina, a neural retinal layer including at least a photoreceptor layer is formed, in which the photoreceptor layer comprises at least one or more cells selected from the group consisting of a photoreceptor cell, a photoreceptor precursor cell and a retinal precursor cell. The retinal pigment epithelial cell sheet has a sheet-like structure formed by retinal pigment epithelial cells in polygonal or flagstone-like cell morphology. The whole of the neural retina and the retinal pigment epithelial cell sheet is embedded in the hydrogel, the tangent directions of the respective surfaces of the neural retina and the retinal pigment epithelial cell sheet are approximately parallel, the apical surface of the neural retina and the apical surface of the retinal pigment epithelial cells face each other, and the neural retina and the retinal pigment epithelial cell sheet are separated by the hydrogel from each other without contact.

<Production of Neural Retina>

The neural retina is derived from a pluripotent stem cell and, specifically, can be obtained by differentiating a pluripotent stem cell. Examples of the differentiation include, but are not particularly limited to, methods disclosed in WO2011/055855, WO2013/077425, WO2015/025967, WO2016/063985, WO2016/063986, WO2017/183732, PLoS One. 2010 Jan. 20; 5 (1): e8763, Stem Cells. 2011 August; 29 (8): 1206-18, Proc Natl Acad Sci USA. 2014 Jun. 10; 111 (23): 8518-23, and Nat Commun 2014 Jun. 10; 5: 4047.

The neural retina is produced as a cell aggregate of the neural retina. In a specific aspect, the cell aggregate of the neural retina can be prepared by a method comprising the following steps (A), (B) and (C):

(A) culturing pluripotent stem cells in a culture medium containing 1) a TGFβ family signaling pathway inhibitor and/or a sonic hedgehog signaling pathway agonist and 2) a factor for maintaining undifferentiated condition in the absence of feeder cells;

(B) forming a cell aggregate by suspension culture in a serum-free medium; and (C) further suspension-culturing the cell aggregate obtained in the step (B) in a culture medium containing a BMP signaling pathway agonist.

This method is also disclosed in, for example, WO2016/063985 and WO2017/183732. For more details, see WO2016/063985 and WO2017/183732.

The TGFβ family signaling pathway inhibitor refers to a substance inhibiting the TGFβ family signaling pathway, i.e., the signaling pathway transduced by the Smad family. Specifically, examples thereof can include TGFβ signaling pathway inhibitors (e.g., SB431542, LY-364947, SB-505124, A-83-01), Nodal/activin signaling pathway inhibitors (e.g., SB431542, A-83-01) and BMP signaling pathway inhibitors (e.g., LDN193189, dorsomorphin). These substances are commercially available and can be obtained.

The sonic hedgehog (hereinafter, also referred to as "Shh") signaling pathway agonist is a substance capable of enhancing signal transduction mediated by Shh. Examples of the Shh signaling pathway agonist include PMA (purmorphamine) and SAG (smoothened agonist).

The concentrations of the TGFβ family signaling pathway inhibitor and the sonic hedgehog signaling pathway agonist can be concentrations capable of inducting differentiation into retinal cells. For example, SB431542 is used at a concentration of usually 0.1 to 200 μM, preferably 2 to 50 μM. A-83-01 is used at a concentration of usually 0.05 to 50 μM, preferably 0.5 to 5 μM. LDN193189 is used at a concentration of usually 1 to 2000 nM, preferably 10 to 300 nM. SAG is used at a concentration of usually 1 to 2000 nM, preferably 10 to 700 nM. PMA is used at a concentration of usually 0.002 to 20 μM, preferably 0.02 to 2 μM.

In the culture of pluripotent stem cells under feeder-free conditions in the step (A), any of the feeder-free media mentioned above containing a factor for maintaining undifferentiated condition may be used as the culture medium.

In the culture of pluripotent stem cells under feeder-free conditions in the step (A), a suitable matrix may be used as a scaffold in order to provide a scaffold as a replacement for feeder cells to the pluripotent stem cells. Examples of the matrix that can be used as a scaffold include laminin (Nat Biotechnol 28, 611-615, (2010)), laminin fragments (Nat Commun 3, 1236, (2012)), basal membrane preparations (Nat Biotechnol 19, 971-974, (2001)), gelatin, collagen, heparan sulfate proteoglycan, entactin, and vitronectin.

The culture time of the pluripotent stem cells in the step (A) is not particularly limited within a range in which an effect of improving the quality of the cell aggregate to be formed in the step (B) can be achieved, and is usually from 0.5 to 144 hours. In an embodiment, it is preferably from 2 to 96 hours, more preferably from 6 to 48 hours, further preferably from 12 to 48 hours, still further preferably from 18 to 28 hours (e.g., 24 hours).

The provision of the serum-free medium and the formation of the cell aggregate can be carried out in the same manner as mentioned above.

In an embodiment, the culture medium that is used in the step (B) contains a sonic hedgehog signaling pathway agonist. As the sonic hedgehog signaling pathway agonist, the one mentioned above can be used at the concentration mentioned above. The sonic hedgehog signaling pathway agonist is preferably contained in the culture medium from the start of suspension culture. A ROCK inhibitor (e.g., Y-27632) may be added to the culture medium. The culture time is, for example, from 12 hours to 6 days.

The BMP signaling pathway agonist is a substance capable of enhancing the signaling pathway mediated by BMP. Examples of the BMP signaling pathway agonist include BMP protein such as BMP2, BMP4 and BMP7, GDF protein such as GDF7, anti-BMP receptor antibodies, and BMP partial peptides. The BMP2 protein, the BMP4 protein and the BMP7 protein are available from, for example, R&D Systems, Inc., and the GDF7 protein is available from, for example, Wako Pure Chemical Industries, Ltd.

Examples of the culture medium to be used include serum-free media and serum media (preferably serum-free media) supplemented with a BMP signaling pathway agonist. The serum-free medium and the serum medium can be provided as mentioned above.

The concentration of the BMP signaling pathway agonist can be a concentration capable of inducing differentiation into retinal cells. For example, human BMP4 protein is added to the culture medium so as to attain a concentration of about 0.01 nM to about 1 μM, preferably about 0.1 nM to about 100 nM, more preferably about 1 nM to about 10 nM, further preferably about 1.5 nM (55 ng/mL).

The BMP signaling pathway agonist can be added about 24 hours or later after the start of suspension culture in the step (A), and may be added to the culture medium within several days (e.g., within 15 days) after the start of suspension culture. Preferably, the BMP signaling pathway agonist is added to the culture medium between Day 1 and Day 15, more preferably between Day 1 and Day 9, most preferably on Day 3, after the start of suspension culture.

In a specific embodiment, a part or the whole of the culture medium is exchanged with a culture medium containing BMP4, for example, on Days 1 to 9, preferably Days 1 to 3, after the start of suspension culture in the step (B) to adjust the final concentration of BMP4 to about 1 to 10 nM. Culture can be performed for, for example, 1 to 12 days, preferably 2 to 9 days, further preferably 2 to 5 days, in the presence of BMP4. In this context, in order to maintain the concentration of BMP4 at the same concentration, a part or the whole of the culture medium can be exchanged with a culture medium containing BMP4 once or about twice. Alternatively, the concentration of BMP4 may be decreased in stages.

Culture conditions such as culture temperature and $CO_2$ concentration in the step (A) to the step (C) can be appropriately set. The culture temperature is, for example, from about 30° C. to about 40° C., preferably about 37° C. The $CO_2$ concentration is, for example, from about 1% to about 10%, preferably about 5%.

Retinal cells at various stages of differentiation can be produced as retinal cells contained in the cell aggregate of the neural retina by varying the culture period in the step (C). In other words, retinal cells in the cell aggregate of the neural retina containing immature retinal cells (e.g., retinal precursor cell, photoreceptor precursor cell) and matured retinal cells (e.g., photoreceptor cell) at various ratios can be produced. The ratio of matured retinal cells can be increased by extending the culture period in the step (C).

The step (B) and/or the step (C) may employ a method disclosed in WO2017/183732. Specifically, in the step (B) and/or the step (C), the cell aggregate of the neural retina can be formed by suspension culture in a culture medium further containing a Wnt signaling pathway inhibitor.

The Wnt signaling pathway inhibitor that is used in the step (B) and/or the step (C) is not particularly limited as long as it is capable of suppressing signal transduction mediated by Wnt, and may be any of a protein, a nucleic acid, a low-molecular compound, and the like. Signals mediated by Wnt are transduced via Wnt receptor present as a heterodimer of frizzled (Fz) and LRP5/6 (low-density lipoprotein receptor-related protein 5/6). Examples of the Wnt signaling pathway inhibitor include, but are not limited to, substances acting directly on Wnt or Wnt receptor (anti-Wnt neutralizing antibody, anti-Wnt receptor neutralizing antibody, etc.), substances suppressing the expression of a gene encoding Wnt or Wnt receptor (e.g., antisense oligonucleotide, siRNA), substances inhibiting the binding of Wnt to Wnt receptor (soluble Wnt receptor, dominant negative Wnt receptor, etc., Wnt antagonist, Dkk1, Cerberus protein, etc.), and substances inhibiting bioactivity caused by signal transduction ascribable to Wnt receptor [e.g., low-molecular compounds such as CKI-7 (N-(2-aminoethyl)-5-chloroisoquinoline-8-sulfonamide), D4476 (4-[4-(2,3-dihydro-1,4-benzodioxin-6-yl)-5-(2-pyridinyl)-1H-imidazol-2-yl]benzamide), IWR-1-endo (IWR1e) (4-[(3aR,4S,7R,7aS)-1,3,3a,4,7,7a-hexahydro-1,3-dioxo-4,7-methano-2H-isoindol-2-yl]-N-8-quinolinyl-benzamide), and IWP-2 (N-(6-methyl-2-benzothiazolyl)-2-[(3,4,6,7-tetrahydro-4-oxo-3-phenylthieno[3,2-d]pyrimidin-2-yl)thio]acetamide)]. One or two or more of these may be contained as the Wnt signaling pathway inhibitor. CKI-7, D4476, IWR-1-endo (IWR1e), IWP-2, and the like are known Wnt signaling pathway inhibitors, and commercially available products, etc. can be appropriately obtained. IWR1e is preferably used as the Wnt signaling pathway inhibitor.

The concentration of the Wnt signaling pathway inhibitor in the step (B) can be a concentration capable of inducing the favorable formation of the cell aggregate. For example, IWR-1-endo is added to the culture medium so as to attain a concentration of about 0.1 μM to about 100 μM, preferably about 0.3 μM to about 30 μM, more preferably about 1 μM to about 10 µM, further preferably about 3 µM. In the case of using a Wnt signaling pathway inhibitor other than IWR-1-endo, it is desirable to be used at a concentration that exhibits Wnt signaling pathway inhibitory activity equivalent to the concentration of IWR-1-endo.

In the step (B), the timing of adding the Wnt signaling pathway inhibitor to the culture medium is preferably earlier. The Wnt signaling pathway inhibitor is added to the culture medium usually within 6 days, preferably within 3 days, more preferably within 1 day, more preferably within 12 hours, from the start of suspension culture in the step (B), further preferably at the start of suspension culture in the step (B). Specifically, for example, the addition of a basal medium supplemented with the Wnt signaling pathway inhibitor, or the exchange of a part or the whole of the culture medium with the basal medium can be performed. Although a period for which the Wnt signaling pathway inhibitor is allowed to act on the cells obtained in the step (A) in the step (B) is not particularly limited, preferably, it is added to the culture medium at the start of suspension culture in the step (B) and then allowed to act until the completion of the step (B) (immediately before addition of a BMP signaling pathway agonist). Further preferably, as mentioned later, exposure to the Wnt signaling pathway inhibitor is continued even after the completion of the step (B) (i.e., during the period of the step (C)). In an embodiment, as mentioned later, the action of the Wnt signaling pathway inhibitor is continued even after the completion of the step (B) (i.e., during the period of the step (C)), and the action may be performed until retinal tissue is formed.

In the step (C), as the Wnt signaling pathway inhibitor, any of the Wnt signaling pathway inhibitors mentioned above can be used. Preferably, the same type as the Wnt signaling pathway inhibitor used in the step (B) is used in the step (C).

The concentration of the Wnt signaling pathway inhibitor in the step (C) can be a concentration capable of inducing retinal precursor cells and retinal tissue. For example, IWR-1-endo is added to the culture medium so as to attain a concentration of about 0.1 µM to about 100 µM, preferably about 0.3 µM to about 30 µM, more preferably about 1 µM to about 10 µM, further preferably about 3 µM. In the case of using a Wnt signaling pathway inhibitor other than IWR-1-endo, it is desirable to be used at a concentration that exhibits Wnt signaling pathway inhibitory activity equivalent to the concentration of IWR-1-endo. The concentration of the Wnt signaling pathway inhibitor in the culture medium in the step (C) is preferably 50 to 150, more preferably 80 to 120, further preferably 90 to 110, when the concentration of the Wnt signaling pathway inhibitor in the culture medium in the step (B) is defined as 100. It is more preferable to be equivalent to the concentration of the Wnt signaling pathway inhibitor in the culture medium in the second step.

The timing of addition of the Wnt signaling pathway inhibitor to the culture medium is not particularly limited within a range that can achieve the formation of an aggregate containing retinal cells or retinal tissue, and is preferably earlier. Preferably, the Wnt signaling pathway inhibitor is added to the culture medium at the start of the step (C). More preferably, the Wnt signaling pathway inhibitor is added in the step (B) and then also continuously (i.e., from the start of the step (B)) contained in the culture medium in the step (C). Further preferably, the Wnt signaling pathway inhibitor is added at the start of suspension culture in the step (B) and then also continuously contained in the culture medium in the step (C). For example, a BMP signaling agonist (e.g., BMP4) can be added to the cultures (suspension of aggregates in a culture medium containing a Wnt signaling pathway inhibitor) obtained in the step (B).

A period for which the Wnt signaling pathway inhibitor is allowed to act is not particularly limited, but is preferably from 2 days to 30 days, more preferably from 6 days to 20 days, from 8 days to 18 days, from 10 days to 18 days, or from 10 days to 17 days (e.g., 10 days), with the start of suspension culture in the step (B) as a commencement when the Wnt signaling pathway inhibitor is added at the start of suspension culture in the step (B). In another embodiment, the period for which the Wnt signaling pathway inhibitor is allowed to act is preferably from 3 days to 15 days (e.g., 5 days, 6 days, 7 days), more preferably from 6 days to 10 days (e.g., 6 days), with the start of suspension culture in the step (B) as a commencement when the Wnt signaling pathway inhibitor is added at the start of suspension culture in the step (B).

A neural retina having a ciliary marginal zone-like structure can also be produced by culturing the cell aggregate of the neural retina obtained by the method mentioned above in a serum-free medium or a serum medium containing a Wnt signaling pathway agonist and/or a FGF signaling pathway inhibitor for a period on the order of 3 days to 6 days (step (D)), followed by culture in a serum-free medium or a serum medium containing neither a Wnt signaling pathway agonist nor a FGF signaling pathway inhibitor for about 30 days to about 60 days (step (E)).

In an embodiment, a neural retina having a ciliary marginal zone-like structure can be produced by the step (D) and the step (E) from the cell aggregate of the neural retina obtained in the steps (A) to (C), the cell aggregate of the neural retina being of Days 6 to 30 or Days 10 to 20 (Day 10, Day 11, Day 12, Day 13, Day 14, Day 15, Day 16, Day 17, Day 18, Day 19 or Day 20) after the start of suspension culture in the step (B).

The Wnt signaling pathway agonist is not particularly limited as long as it is capable of enhancing signal transduction mediated by Wnt. Examples of a specific Wnt signaling pathway agonist can include GSK3β inhibitors (e.g., 6-bromoindirubin-3'-oxime (BIO), CHIR99021, kenpaullone). For example, in the case of CHIR99021, the range of about 0.1 µM to about 100 µM, preferably about 1 µM to about 30 µM, can be included.

The FGF signaling pathway inhibitor is not particularly limited as long as it can inhibit signal transduction mediated by FGF. Examples of the FGF signaling pathway inhibitor include SU-5402, AZD4547, and BGJ398. For example, SU-5402 is added at a concentration of about 0.1 µM to about 100 µM, preferably about 1 µM to about 30 µM, more preferably about 5 µM.

A part of the step (E) or the whole step can perform culture using a culture medium for continuous epithelial tissue maintenance disclosed in WO2019/017492. Specifically, the continuous epithelium structure of the neural retina can be maintained by culture using a culture medium for continuous epithelial tissue maintenance. One example of the culture medium for continuous epithelial tissue maintenance can include a medium in which Neurobasal medium (e.g., manufactured by Thermo Fisher Scientific Inc., 21103049) is blended with B27 supplement (e.g., Thermo Fisher Scientific Inc., 12587010).

In a part of the step (E) or the whole step, in the case of using any medium of the basal medium for cell proliferation, the culture medium for continuous epithelial tissue maintenance or a mixture of these media, a thyroid hormone signaling pathway agonist may be further contained. By culture in a culture medium containing a thyroid hormone signaling pathway agonist, the production of a cell aggregate containing a neural retina becomes possible in which the ratio of bipolar cells, amacrine cells, ganglion cells or horizontal cells, etc. contained in the neural retina is low and the ratio of photoreceptor precursor cells has been increased.

In the specification, the thyroid hormone signaling pathway agonist is a substance capable of enhancing signal transduction mediated by thyroid hormone, and is not particularly limited as long as it is capable of enhancing the thyroid hormone signaling pathway. Examples of the thyroid hormone signaling pathway agonist include triiodothyronine (hereinafter, also abbreviated to T3), thyroxin (hereinafter, also abbreviated to T4), and thyroid hormone receptor (preferably TRβ receptor) agonists.

In the case of using T3 as the thyroid hormone signaling pathway agonist, it can be added to the culture medium so as to attain, for example, the range of 0.1 to 1000 nM. Preferably, examples thereof include concentrations having thyroid hormone signaling enhancing activity that corresponds to T3 with a concentration of 1 to 500 nM; more preferably 10 to 100 nM; further preferably 30 to 90 nM; still more preferably around 60 nM. In the case of using T4 as the thyroid hormone signaling pathway agonist, it can be added to the culture medium so as to attain, for example, the range of 1 nM to 500 μM. Preferably, it is the range of 50 nM to 50 μM; more preferably 500 nM to 5 μM. In the case of using other thyroid hormone receptor agonists, the concentration can exhibit activity equivalent to the agonist activity exhibited by T3 or T4 with the concentration mentioned above.

The culture medium that is used in the step (E) may appropriately contain L-glutamine, taurine, serum, or the like. The culture medium that is used in the step (E) is, as one example, a culture medium that is not supplemented with one or more (preferably all) selected from the group consisting of a BMP signaling pathway agonist, a FGF signaling pathway inhibitor, a Wnt signaling pathway agonist, a Wnt signaling pathway inhibitor, a SHH signaling pathway agonist, a TGFβ family signaling pathway inhibitor and a TGFβ family signaling pathway agonist.

The cell aggregate of the neural retina can be produced by the method mentioned above, though not limited thereto.

The neural retina according to the present invention contains a neural retinal layer including a photoreceptor layer and an inner layer. The photoreceptor layer comprises one or more cells selected from the group consisting of a photoreceptor precursor cell and a photoreceptor cell, has the structure of epithelial tissue, and has an apical surface and a base. The structure of the epithelial tissue is preferably a continuous epithelium structure.

In an embodiment, the neural retina according to the present invention can be obtained by dissection from the cell aggregate of the neural retina using tweezers, a knife, scissors, or the like. A neural retinal sheet can be obtained by dissection from a sphere-like cell aggregate of the neural retina. The neural retinal sheet means a multilayer sheet-like structure that maintains the layer structure of the neural retinal layer mentioned above.

In an embodiment, the neural retina according to the present invention may be a neural retina obtained from a cell aggregate obtained by differentiating a human pluripotent stem cell. The cell aggregate contains at least first epithelial tissue and second epithelial tissue. The first epithelial tissue contains a human neural retina, and the second epithelial tissue has the continuity of the slope of a tangent line to a surface different from the continuity of the slope of a tangent line to the surface of the first epithelial tissue, and may contain a cell other than a retinal cell and/or a retinal pigment epithelial cell. Examples of the cell other than a retinal cell contained in the second epithelial tissue include cells of eyeball-related tissue and/or brain and spinal cord tissue. Examples of the eyeball-related tissue include retinal pigment epithelial cells and ciliary marginal zone structures. The neural retina according to the present invention can be obtained by dissecting the neural retina from the aggregate so as not to visually contain the second epithelial tissue. The neural retina according to the present invention may contain a region on the first epithelial tissue most distant from the second epithelial tissue, particularly, a region of the center and/or its neighborhood of the first epithelial tissue, in the cell aggregate. In an embodiment, the neural retina according to the present invention may contain a region of the center and/or its neighborhood of continuous epithelial tissue.

In an embodiment, the neural retina according to the present invention is a neural retina
(1) being derived from a pluripotent stem cell,
(2) having a three-dimensional structure,
(3) comprising a neural retinal layer having a plurality of layer structures including a photoreceptor layer and an inner layer,
(4) the photoreceptor layer comprising one or more cells selected from the group consisting of a photoreceptor precursor cell and a photoreceptor cell,
(5) the inner layer comprising one or more cells selected from the group consisting of a retinal precursor cell, a ganglion cell, an amacrine cell and a bipolar cell,
(6) the surface of the neural retinal layer having an apical surface,
(7) the inner layer being present inside the photoreceptor layer present along the apical surface,
(8) the area of the neural retinal layer being 50% or more with respect to the total area of the surface of the neural retina, and
(9) the area of a continuous epithelium structure being 80% or more with respect to the total area of the apical surface of the neural retinal layer.

The neural retina (3) comprises a neural retinal layer having a plurality of layer structures including a photoreceptor layer and an inner layer. As described in (6) and (7), although the photoreceptor layer is present outside (surface) the neural retina, an ectopic photoreceptor layer may be present in the inner layer.

In the neural retina, (5) the inner layer comprises one or more cells selected from the group consisting of a retinal precursor cell, a ganglion cell, an amacrine cell and a bipolar cell, but may comprise one or more cells selected from the group consisting of an ectopic photoreceptor precursor cell and photoreceptor cell. In an embodiment, a neural retina in which the content of a ganglion cell, an amacrine cell and a horizontal cell is 30% or less of the total number of cells, a neural retina in which the content of a ganglion cell, an amacrine cell, a horizontal cell and a bipolar cell is 30% or less of the total number of cells, and/or a neural retina in which the content of a bipolar cell is 10% or less of the total number of cells is also provided.

In the neural retina, (8) the area of the neural retinal layer is 40% or more, preferably 50% or more, more preferably 60% or more, with respect to the total area of the surface of the neural retina. In the neural retina, (9) the area of a continuous epithelium structure is 60% or more, preferably 70% or more, more preferably 80% or more, with respect to the total area of the apical surface of the neural retinal layer.

In an embodiment, the major axis of the neural retina according to the present invention may be, for example, from 300 μm to 3300 μm and is preferably from 600 μm to 2500 μm, more preferably from 1100 μm to 1700 μm.

In an embodiment, the minor axis of the neural retina according to the present invention may be, for example, from 100 μm to 2000 μm and is preferably from 200 μm to 1500 μm, more preferably from 400 μm to 1100 μm.

In an embodiment, the height of the neural retina according to the present invention may be, for example, from 50 μm to 1500 μm and is preferably from 100 μm to 1000 μm, more preferably from 200 μm to 700 μm.

In an embodiment, the volume of the neural retina according to the present invention may be, for example, from 0.001 mm³ to 4.0 mm³ and is preferably from 0.01 mm³ to 1.5 mm³, more preferably from 0.07 mm³ to 0.57 mm³.

Methods for measuring the major axis, minor axis and height of the neural retina are not particularly limited, and they can be measured, for example, from an image taken under a microscope. For example, a front image taken with a cut surface turned to an objective lens side, and a side image taken with the cut surface inclined so as to be perpendicular to an objective lens are taken under a stereo microscope as to the neural retina dissected from a cell aggregate, and they can be measured from the taken images. In this context, the major axis means the longest line segment among line segments connecting two end points on the sheet cross section in the front image, and the length thereof. The minor axis means the longest line segment among line segments connecting two end points on the sheet cross section in the front image and orthogonal to the major axis, and the length thereof. The height means the longest line segment among line segments orthogonal to the sheet cross section and having a point intersecting the sheet cross section and the apex of the retina sheet as end points, and the length thereof. The volume of the sheet means a volume calculated according to the following calculation expression by approximating a neural retina as being an ellipsoid halved such that the cross section passes through the major axis.

Volume=2/3×Ratio of the circumference of a circle (π)×(Major axis/2)×(Minor axis/2)×Height <Production of Retinal Pigment Epithelial Cell Sheet>

The retinal pigment epithelial (RPE) cell is derived from a pluripotent stem cell and, specifically, can be obtained by differentiating a pluripotent stem cell. Examples of a method for producing the retinal pigment epithelial cells include, but are not particularly limited to, methods disclosed in WO2005/070011, WO2006/080952, WO2011/063005, WO2012/173207, WO2015/053375, WO2015/053376, WO2015/068505, WO2017/043605, Stem Cell Reports, 2 (2), 205-218 (2014) and Cell Stem Cell, 10 (6), 771-785 (2012). It is also possible to prepare the retinal pigment epithelial (RPE) cell sheet by modifying the method described in WO2016/063985 mentioned above. Retinal pigment epithelial cells may be produced as a cell sheet or a sphere-like cell aggregate. For production as a sphere-like cell aggregate, for example, it is possible to prepare the RPE cell sheet by cutting open the cell aggregate using tweezers, a knife, scissors, or the like.

As a modified version of the method described in WO2016/063985, pluripotent stem cells are, as in the method mentioned above, 1) treated with a TGFβ family signaling pathway inhibitor and a sonic hedgehog signaling pathway agonist on the day before differentiation, in the absence of feeder cells, and 2) cultured under conditions without treatment with a sonic hedgehog signaling pathway agonist at the start of differentiation. Then, the steps (B) and (C) mentioned above are performed. It is preferable to start the step (D) earlier. Specifically, the step (D) is started around 9 days from (e.g., 7 days, 8 days, 9 days, 10 days or 11 days after) the start of suspension culture in the step (B). Then, the step (E) mentioned above may be carried out. By this method, a cell aggregate of sphere-like RPE cells is obtained. The cell aggregate may be dispersed to prepare a cell suspension, or the cell aggregate may be cut open using tweezers, a knife, scissors or the like to prepare a RPE cell sheet. The dispersed cell suspension may be cultured by adhesion culture to prepare a RPE cell sheet.

The retinal pigment epithelial cell sheet may be further cultured until having polygonal or flagstone-like cell morphology before contact with the cell aggregate of the neural retina. In this case, although the culture medium is not particularly limited, the culture medium may be exchanged with a maintenance medium for retinal pigment epithelial cells (hereinafter, also referred to as a RPE maintenance medium), followed by further culture. As a result, a melanin pigmented cell group or a cell group having polygonal flat morphology adhering to the basal membrane can be more clearly observed. Culture in the RPE maintenance medium is not limited as long as a colony of retinal pigment epithelial cells is formed. For example, while the whole amount of the culture medium is exchanged at a frequency of every three days or more, culture is performed for about 5 to 20 days. Those skilled in the art can readily set a culture period while confirming the morphology. A maintenance medium for retinal pigment epithelial cells described in, for example, IOVS, March 2004, Vol. 45, No. 3, Masatoshi Haruta et al., IOVS, November 2011, Vol. 52, No. 12, Okamoto et al., Cell Science 122 (17), Fumitaka Osakada et al., and February 2008, Vol. 49, No. 2, Gamin et al. can be used.

In an embodiment, the major axis of the retinal pigment epithelial cell sheet may be, for example, in the range of 3 mm to 50 mm, 5 mm to 30 mm, or 10 mm to 20 mm.

In an embodiment, the minor axis of the retinal pigment epithelial cell sheet may be, for example, in the range of 2 mm to 40 mm, 5 mm to 30 mm, or 10 mm to 20 mm.

The degree of melanin pigmentation of the retinal pigment epithelial cell sheet is not particularly limited. The degree of melanin pigmentation in retinal pigment epithelial cells contained in the retinal pigment epithelial cell sheet is preferably equivalent among the cells. In an embodiment, the average melanin content of the retinal pigment epithelial cell sheet may be less than 20 pg/cell, less than 15 pg/cell, less than 10 pg/cell, less than 8 pg/cell, less than 7 pg/cell, less than 6 pg/cell, less than 5 pg/cell, less than 4 pg/cell, less than 3 pg/cell, less than 2 pg/cell, or less than 1 pg/cell. The average melanin content of the retinal pigment epithelial cell sheet may be 0.1 pg/cell or more, 0.5 pg/cell or more, 1 pg/cell or more, 2 pg/cell or more, or 5 pg/cell or more.

The melanin content of the retinal pigment epithelial cell sheet can be measured, for example, by dispersing the retinal pigment epithelial cell sheet, followed by extraction with NaOH or the like, and measuring the cell extracts using a spectrophotometer or the like. The average melanin content can be determined by dividing the melanin content by the total number of cells contained in the retinal pigment epithelial cell sheet.

<Hydrogel>

The hydrogel according to the present invention can be a hydrogel that can embed cells alive, and can be, for example, a hydrogel of gelatin, a hydrogel of collagen, a hydrogel of pectin, a hydrogel of hyaluronic acid, or a hydrogel of alginic acid and is preferably a hydrogel of gelatin. These hydrogels have biodegradability and the desired melting point and are therefore easy to handle. In addition, a high graft survival rate can be expected. The biodegradability means being degraded by an enzyme or the like in vivo, and absorbed or excreted. The hydrogel according to the present invention is a hydrogel having a melting point in the range of 20° C. to 40° C. Specifically, its feature is that the hydrogel is melted at a body temperature when transplanted. Hereinafter, its physical properties will be described in detail by taking "gelatin" as an example. Hydrogels other than gelatin are preferably hydrogels having physical properties similar to those of gelatin mentioned later.

The "gelatin" is a solubilized form of water-insoluble collagen, for example, by pretreatment with an acid or an alkali and thermal hydrolysis. In the specification, it means gelatin in the state of a hydrogel unless otherwise specified, but is also clearly described as a "hydrogel of gelatin". Collagen is divided into three random molecules through the disruption of its triple-helical molecular structure by heating and thereby solubilized. Beef bone and bovine hide, porcine skin, pig bone, fish skin, or the like is typically used as a starting material of gelatin. In order to extract gelatin from these collagen starting materials, the pretreatment of the starting material is performed using an inorganic acid such as hydrochloric acid or sulfuric acid, or lime. Depending on the pretreatment conditions of the starting material, the former is also called acid-treated gelatin (or A-type gelatin) and the latter is also called alkali-treated (limed) gelatin (B-type gelatin). The acid-treated gelatin and the alkali-treated gelatin differ in the properties of gelatin. Hydrolysis by heat treatment decreases the molecular weight of gelatin and improves the solubility thereof. Its jelly strength is reduced under this condition. For example, the heat treatment can be performed with warm water (50° C. to 80° C.) and may be repeated a plurality of times. It is also possible to obtain commercially available gelatin. Examples thereof include gelatin LS-H (Nitta Gelatin Inc., alkali-treated porcine skin gelatin, no-heat-treated gelatin, high jelly strength) and gelatin LS-W (Nitta Gelatin Inc., alkali-treated porcine skin gelatin, heat-treated gelatin, low jelly strength). Alkali-treated (limed) gelatin (B-type gelatin) is preferable, and heat-treated gelatin is preferable.

Collagen is constituted by three polypeptide chains (α chains) having a molecular weight of about 100,000. A collagen molecule is denatured by heat treatment and thereby divided into three α chains (α components). In addition, a dimer of the α chains (β component; a molecular weight of about 200,000) and a trimer thereof (γ component; a molecular weight of about 300,000) may be produced. Depending on the treatment step of gelatin, some intermolecular or intramolecular bonds of collagen or gelatin are randomly cleaved. Therefore, gelatin is an aggregate of molecules having various molecular weights. Commercially available gelatin usually has a molecular weight distribution of several tens of thousands to several millions, though differing depending on the presence or absence of heat treatment, etc. In an embodiment, it is preferable that 50% or more (preferably 60% or more, 70% or more, 80% or more, or 90% or more) gelatin should have a molecular weight distribution included in the range of about 100,000 to about 300,000. A preferable average molecular weight of gelatin is in the range of about 50,000 to about 1,000,000, about 100,000 to about 800,000, about 100,000 to about 600,000, about 200,000 to about 500,000, or about 300,000 to about 500,000.

The molecular weight distribution and the average molecular weight can be measured by methods known to those skilled in the art. For example, the molecular weight distribution can be predicted by determining a chromatogram by gel filtration method using an aqueous gelatin solution and high-performance chromatography. Further, the average molecular weight can be predicted on the basis of pullulan or the like.

The "isoionic point" means a pH that is exhibited by a protein or an aqueous solution of an ampholyte in the absence of other ions (except for a hydrogen ion produced by the ionization of water, a hydroxide ion, and an ion of the ampholyte itself of interest). The isoionic point can be measured by a method known to those skilled in the art. As a specific example, the hydrogen ion concentration of a test solution (aqueous gelatin solution) desalted with an ion-exchange resin can be measured using a pH meter. For example, since alkali treatment in a gelatin production step deamidates a great majority, the isoionic point is as low as about pH 5. By contrast, the acid-treated gelatin has a low rate of deamidation and exhibits an isoionic point from pH 7 to 9 which is close to collagen. The aqueous gelatin solution is + (positively) charged in a pH region lower than the isoionic point and − (negatively) charged in a higher pH region. In the specification, it is preferable that the hydrogel (gelatin, etc.) should exhibit an isoionic point from about pH 4 to about pH 7, from about pH 5 to about pH 7, or from about pH 6 to about pH 7.

The hydrogel containing gelatin is heated or cooled so that the solution exhibits a phase change from gel to sol or from sol to gel. The hydrogel of gelatin, etc. is converted to gel (jelly) by losing fluidity through cooling and converted to sol (aqueous solution) by acquiring fluidity through heating. When gelatin is taken as an example, gelatin is converted to jelly because some gelatin molecules take a helical structure similar to that of collagen by cooling and thereby form an intermolecular network. In this context, the "melting point" means a solation temperature at a predetermined pressure, and the "freezing point" means a gelation temperature at a predetermined pressure. As mentioned above, stronger gel is formed by continuous cooling. In the specification, the melting point of the hydrogel is from 20° C. to 40° C. (e.g., from 20° C. to 35° C., from 25° C. to 35° C., from 30° C. to 40° C., or from 35° C. to 40° C.). In general, the melting point of gel is a measure for the strength of a network. The melting point of the hydrogel (e.g., gelatin) is elevated with the elevation of the concentration and molecular weight of the hydrogel. For example, the melting point and the freezing point tend to be elevated as a solid content is increased with a saccharide. Thus, it is possible to vary the melting point and the freezing point within predetermined ranges.

A method for measuring the melting point of the hydrogel is not particularly limited, and it can be measured by, for example, a method prescribed in JIS K6503. Specifically, gel having a height of 45 mm from a position of a 5 mm end is prepared from a test solution (e.g., a gelatin solution having a concentration of 10 w/w %) in a glass tube having 10 mm in diameter, and placed in a water tank such that the 5 mm end is positioned at the bottom. A temperature at which the gel is melted when heated so that the upper end of an air bubble is elevated by 10 mm may be defined as a melting point.

A method for measuring the freezing point of the hydrogel is not particularly limited, and it can be measured by, for example, a method prescribed in JIS K6503. Specifically, a test solution (e.g., a gelatin solution having a concentration of 10 w/w %) set to 35° C. is gradually cooled with stirring in a water tank of 15° C. having a buffering bath of 35° C.

A temperature at which a return phenomenon (phenomenon in which air bubbles or the like resulting from the stirring of a solution do not inertially move in the direction of stirring and are instead brought back to the opposite direction, when the stirring is stopped) is found may be defined as a freezing point. In order to facilitate confirming the return phenomenon, the test solution may be placed in a filter paper strip or the like.

The "jelly strength" of the hydrogel means the mechanical strength of an object that has formed gel. It is usually expressed as force required for deforming gel in a predetermined shape or force required for breaking gel (unit: g, dyne(s)/cm$^2$ or g/cm$^2$), and is typically a measure for the hardness of gel. 1 dyne is defined as force which when acting on a body of mass 1 g produces an acceleration of 1 cm/s$^2$ in that direction. For example, the jelly strength of the hydrogel containing gelatin varies depending on specific properties such as a molecular weight under the same conditions, though varying due to its concentration, temperature, pH and a coexistent substance, etc. The "jelly strength" of gelatin is tested by, for example, a method prescribed in Pharmaceutical and Food Safety Bureau (PFSB) Notification No. 0531(3) of the Japanese Pharmacopoeia or JIS K6503. Specifically, jelly is prepared by cooling a gelatin solution at 10° C. for 17 hours, and load required for pushing down its surface by 4 mm using a plunger having a diameter of ½ inches (12.7 mm) is defined as jelly strength. Usually, the jelly strength is increased with increase in gelatin concentration. Usually, the jelly strength of gelatin is largely decreased at acidic pH (e.g., pH 4 or less) and alkaline pH (e.g., pH 8 or more). The jelly strength is elevated with the elevation of a molecular weight within a certain range (e.g., a molecular weight of 30,000 to 70,000), whereas the jelly strength becomes constant at a certain level or more (e.g., a molecular weight of 100,000 or more). Usually, gelation requires cooling at 20° C. or less. For example, the jelly strength becomes higher at a lower cooling temperature within a cooling temperature range on the order of, for example, 4° C. to 20° C. Since reaction for molecular orientation or network formation proceeds at a relatively slow rate, an intermolecular network is formed in the inside even after gel formation. Therefore, the jelly strength is elevated over about 1 to 5 hours after the start of cooling. Also, the jelly strength is elevated by rapid cooling. This is because an intermolecular network is finely formed without much time for molecular orientation.

In the specification, the hydrogel may have jelly strength in a range that does not influence a cell or a tissue to be embedded, for example, at 10° C. to 20° C., and to an extent that it does not disrupt in the usual transplantation operation, etc. of the composite. As for the jelly strength of about 5% to 30% by weight of the hydrogel (gelatin), the jelly strength of the hydrogel (gelatin) may be, for example, 50 g or more, 100 g or more, 200 g or more, 500 g or more, 1000 g or more, 1200 g or more, 1300 g or more, 1400 g or more or 1500 g or more in a method prescribed in JIS K6503. The jelly strength of the hydrogel (gelatin) may be 3000 g or less, 2500 g or less or 2000 g or less.

The "viscosity" is an index that represents the strength of stickiness of a fluid. The viscosity can be measured by a method known to those skilled in the art. It can be measured by, for example, a method prescribed in JIS K6503. Specifically, a time for which a predetermined amount of a gelatin solution (60° C., 6.67%) flows down in a pipette-based viscometer may be converted to a viscosity value (unit: mPa·s).

The viscosity in a sol state of the hydrogel containing gelatin is influenced by the concentration of gelatin, etc., the temperature of the system, pH, coexistent salts, etc. In general, the viscosity is elevated with the elevation of the concentration of gelatin, etc. or decrease in temperature. For example, the viscosity of B-type gelatin depends on pH, and the viscosity becomes minimal around pH of an isoionic point. On the other hand, A-type gelatin is not found to have a marked relationship between viscosity and pH.

The viscosity of the hydrogel containing gelatin is not particularly limited as long as it is viscosity to an extent that the composite mentioned later can be formed. Since live cells are embedded therein, it is necessary to embed cells using the hydrogel of about 40° C. (from about 30° C. to about 50° C.) in consideration of damage on the cells. Thus, the hydrogel exhibits, for example, viscosity required for embedding cells at about 40° C. (from about 30° C. to about 50° C.), for example, viscosity on the order of 2 to 50 mPa·s (from 5 to 30 mPa·s).

The "rate of foaming" means the ratio of the total volume ($V_1$) including foam to the original volume ($V_0$) of a sample ($V_1/V_0$). A lower rate of foaming is more preferable. Specifically, it is 1.2 or less (preferably 1.15 or less, 1.1 or less, or 1.05 or less). The rate of foaming can be measured by a PAGI method, a method for testing photographic gelatin, the 10th edition (2006 edition). Specifically, 50 mL of a test solution of 50° C. placed in a measuring cylinder is vibrated for 1 minute at an amplitude of 300 mm at a frequency of 145 times/min. Then, the total volume including foam may be read 3 minutes after the termination of vibration.

It is preferable that the hydrogel described in the specification should meet the criteria of a purity test prescribed in the Japanese Pharmacopoeia, because it is administered in vivo by transplantation. For example, the specifications and testing methods of the quality of gelatin and purified gelatin are prescribed in the Japanese Pharmacopoeia. Specifically, the following criteria are satisfied.

(1) Off-flavor and insoluble matter: 40 mL of water is added to 1.0 g of the product, and when it is melted by heating, the solution has no unpleasant odor. This solution is clear or turbid only slightly, and its color is not darker than that of solution A for color comparison.
(2) Sulfite: 60 ppm or less
(3) Heavy meatal: 50 ppm or less (20 ppm or less)
(4) Arsenic: 1 ppm or less
(5) Mercury: 0.1 ppm or less
(6) Loss in weight on drying: 15.0% or less
(7) Ignition residue: 2.0% or less A higher concentration of the hydrogel is more preferable from the viewpoint of preventing disrupt ascribable to various operations or dissolution, etc. during operation. The concentration of the hydrogel is the ratio of the hydrogel to a vehicle (solvent) in which the hydrogel is dissolved. In the case of using, for example, gelatin, the concentration of the hydrogel may be from 10% to 50% by weight and is preferably from 25% to 50% by weight, from 30% to 50% by weight, or from 20% to 40% by weight.

The weighed hydrogel may be dissolved in a suitable vehicle such that the concentration of the hydrogel falls within the range mentioned above. The vehicle may be a vehicle that does not influence cells. Examples thereof include buffered salt solutions such as HBSS.

The pH of the hydrogel is preferably around neutrality for the purpose of reducing damage on a tissue to be embedded or a living body after transplantation. It may be, for example, from 6 to 8 or from 6.5 to 7.5 and is preferably from 7 to 7.5. The pH of the hydrogel may be measured as pH in a solution or sol state. As mentioned above, jelly strength is not largely reduced within the pH range. A method for measuring the pH of the hydrogel is not particularly limited, and it can be measured using, for example, a commercially available pH meter or a pH test strip.

In an embodiment, the hydrogel is preferably a hydrogel having biodegradability. It is preferable that after the composite is transplanted to a human, the transplanted neural retina and retinal pigment epithelial cell sheet should be gradually contacted with each other by the biodegradation of the biodegradable hydrogel so that after maturation, the outer segments of photoreceptor cells come into contact with the retinal pigment epithelial cell sheet, as in a retina in vivo. Alternatively, the transplanted retinal pigment epithelial cell sheet may have a function of suppressing the exudation of newborn blood vessels, and/or a function of permitting retinoid cycles, outer segment phagocytosis, nutrient supply, even if not contacted. Gelatin, which is obtained by treating the main in vivo constituent collagen, is a hydrogel having biodegradability.

In an embodiment, the hydrogel in the specification is preferably a hydrogel that has a melting point in the range of 20° C. to 40° C. and satisfies one or more of the following physical properties:

(1) preparation method: alkali treatment and/or heat treatment
(2) average molecular weight: from about 100,000 to about 500,000
(3) concentration: from 10% to 50% by weight (preferably from 25% to 50% by weight, from 30% to 50% by weight, or from 20% to 40% by weight)
(4) jelly strength: 50 g or more, 100 g or more, 200 g or more, 500 g or more, 1000 g or more, 1200 g or more, 1300 g or more, 1400 g or more or 1500 g or more (3000 g or less, 2500 g or less or 2000 g or less)
(5) pH: from 6 to 8 (preferably from 6.5 to 7.5 or from 7 to 7.5)
(6) isoionic point: acidic region (from about pH 4 to about pH 7, from about pH 5 to about pH 7, or from about pH 6 to about pH 7)
(7) rate of foaming: 1.2 or less (preferably 1.15 or less, 1.1 or less, or 1.05 or less)
(8) viscosity: from about 5 to 30 mPa·s at about 40° C. (from about 30° C. to 50° C.)

<Structure of Composite>

In an embodiment, in the composite according to the present invention, the hydrogel embeds the whole of the neural retina and the retinal pigment epithelial cell sheet. The term "embed" means that cells, etc. are covered in a buried state by the hydrogel. The neural retina and the retinal pigment epithelial cell sheet embedded may be, for example, in a condition in which the hydrogel is present between the neural retina and the retinal pigment epithelial cell sheet and around them. In the application, particularly, since use of a separately produced or isolated neural retina and retinal pigment epithelial cell sheet is intended, retinal pigment epithelial cells do not constitute a continuous epithelium structure together with a neural retinal layer.

In the composite, the hydrogel may have a single-layer structure or may have a 2-layer or more structure. In an embodiment, the composite may have a first hydrogel layer which embeds only the retinal pigment epithelial cell sheet, and a second hydrogel layer which embeds the first hydrogel layer and the neural retina. In another embodiment, the composite may have a first hydrogel layer which embeds only the neural retina, and a second hydrogel layer which embeds the first hydrogel layer and the retinal pigment epithelial cell sheet.

In the composite according to the present invention, the respective tangent directions of the neural retina and the retinal pigment epithelial cell sheet are approximately parallel. The phrase "tangent directions are approximately parallel" means that the tangent directions of surfaces on which the neural retina and the retinal pigment epithelial cell sheet face each other are parallel. In the composite according to the present invention, the apical surface of the neural retina and the apical surface of the retinal pigment epithelial cells face each other. Specifically, the apical surface of the neural retina and the apical surface of the retinal pigment epithelial cells are located adjacent to each other.

In an embodiment, the neural retina and the retinal pigment epithelial cell sheet in the composite are separated by the hydrogel from each other without contact. Hence, damage on cells ascribable to the mechanical contact between the neural retina and the retinal pigment epithelial cell sheet can be reduced. The "neural retina and the retinal pigment epithelial cell sheet without contact" mean that the neural retina and the retinal pigment epithelial cell sheet are in no physical contact. The neural retina and the retinal pigment epithelial cell sheet without contact separated by the hydrogel can be confirmed, for example, visually (e.g., under a microscope).

In the composite according to the present invention, the neural retina to be embedded in the hydrogel may be a single continuous neural retina or may be a plurality of continuous neural retinas. It is preferable that a plurality of neural retinas should be embedded therein because a wide range of disorder conditions of retinal tissues or damage conditions of retinal tissues can be treated with one composite. In this case, it is preferable that a plurality of neural retinas should be arranged such that their respective apical surfaces face the same direction. The retinal pigment epithelial cell sheet to be embedded in the hydrogel may be a single continuous sheet-like retinal pigment epithelial tissue or may be a plurality of continuous sheet-like retinal pigment epithelial tissues. When a plurality of retinal pigment epithelial tissues are embedded in the hydrogel, it is preferable that the retinal pigment epithelial tissues should be arranged side by side such that their respective apical surfaces face the same direction.

[Method for Producing Composite]

One aspect of the present invention is a method for producing a composite comprising a neural retina, a retinal pigment epithelial cell sheet, and a hydrogel. In the production method according to the present invention, the same embodiments as those described about the composite mentioned above can be applied to the composite to be produced and the neural retina, the retinal pigment epithelial cell sheet and the hydrogel contained in the composite.

In the production method according to the present invention, each of the neural retina and the retinal pigment epithelial cell sheet is derived from a human pluripotent stem cell. The melting point of the hydrogel is from 20° C. to 40° C., and, for example, the hydrogel mentioned above can be used. Preferably, the hydrogel is a hydrogel of gelatin.

In the case of producing the neural retina and the retinal pigment epithelial cell sheet by culture on extracellular matrix (e.g., collagen), peeling using an enzyme degrading the extracellular matrix (e.g., collagenase) may be performed for the recovery of the neural retina and the retinal pigment epithelial cell sheet. In this case, for preventing contamination by the enzyme, it is preferable to perform washing a plurality of times with a culture medium or the like.

Examples of the method for producing the composite include a method of simultaneously embedding the neural retina and the retinal pigment epithelial cell sheet (also referred to as a one-stage embedding method), and a method of first embedding either of the neural retina or the retinal pigment epithelial cell sheet to form a hydrogel layer, and then embedding the hydrogel layer and the other one of the neural retina and the retinal pigment epithelial cell sheet (also referred to as a two-stage embedding method). Embedding in two stages is preferred because the physical contact between the neural retina and the retinal pigment epithelial cell sheet is avoided.

In an embodiment, the production method according to the present invention is a two-stage embedding method comprising:

(1) a first step of loading either one of the retinal pigment epithelial cell sheet and the neural retina in a container;

(2) a second step of adding a hydrogel in a fluid state to the container loaded with the either one of the retinal pigment epithelial cell sheet and the neural retina;

(3) a third step of solidifying the hydrogel by cooling so as to embed the whole of the either one of the retinal pigment epithelial cell sheet and the neural retina to form a first hydrogel layer having the either one of the retinal pigment epithelial cell sheet and the neural retina and the hydrogel;

(4) a fourth step of further loading the other on the first hydrogel layer such that the tangent directions of the respective surfaces of the either one of the retinal pigment epithelial cell sheet and the neural retina in the first hydrogel layer and the other are approximately parallel and the apical surface of the neural retina and the apical surface of the retinal pigment epithelial cells face each other;

(5) a fifth step of adding a hydrogel in a fluid state to the container further loaded with the other of the retinal pigment epithelial cell sheet and the neural retina; and (6) a sixth step of solidifying the hydrogel by cooling so as to embed the whole of the first hydrogel layer and the neural retina to form a second hydrogel layer having the first hydrogel layer, the other of the retinal pigment epithelial cell sheet and the neural retina, and the hydrogel.

(1) In the first step, a method for loading either one of the retinal pigment epithelial cell sheet and the neural retina into a container is not particularly limited, and it can be loaded using, for example, tweezers or a flat instrument that scoops the sheet. The container is not particularly limited and can be suitably selected according to the size of the retinal pigment epithelial cell sheet or the neural retina. Examples thereof include Petri dishes, glass slides, silicon sheets, and plastic containers.

(2) In the second step, a method for adding the hydrogel to the container is not particularly limited, and the addition can be performed by, for example, a method using Pipetman or a dropper. In the case of loading the retinal pigment epithelial cell sheet in the first step, it is preferred to add the hydrogel gently and slowly such that the retinal pigment epithelial cell sheet can maintain a sheet form. The temperature of the hydrogel in a fluid state may be, for example, from about 25° C. to about 50° C., preferably from 30° C. to 40° C., in consideration of damage on cells.

(3) In the third step, the hydrogel is solidified by cooling together with the container to, for example, 2° C. to 8° C., preferably 4° C. to 5° C., so as to embed either one of the retinal pigment epithelial cell sheet and the neural retina loaded in the first step to form a first layer of the hydrogel. The cooling temperature in the third step may be a temperature lower by 15° C. to 25° C. (preferably 20° C. to 25° C.) than the melting point. The cooling time may be a time for which the hydrogel is solidified, and differs depending on the type of the hydrogel. The time as short as possible is preferable in consideration of the harmful effect of a low temperature on cells. It may be, for example, from 10 minutes to 1 hour and may be from 5 minutes to 3 hours or 5 hours or more. Examples of a cooling approach include, but are not particularly limited to, ice, refrigerators of 4° C., and refrigerants.

(4) In the fourth step, a method for loading the other one of the retinal pigment epithelial cell sheet and the neural retina onto the first layer of the hydrogel is not particularly limited, and it can be loaded by, for example, a method using tweezers or a medicine spoon. This loading is performed such that the tangent directions of the respective surfaces of the retinal pigment epithelial cell sheet and the neural retina are approximately parallel and the apical surface of the neural retina and the apical surface of the retinal pigment epithelial cells face each other. By loading in this condition, transplantation is achieved in orientation similar to that of a retina in vivo.

(5) In the fifth step, the temperature of the hydrogel in a fluid state may be, for example, from about 25° C. to about 50° C., preferably from 30° C. to 40° C., in consideration of damage on cells. The temperature of the hydrogel in a fluid state in the fifth step may be the same as or different from that in the second step.

In the fifth step, the hydrogel can be added to the container by the same approach as in the second step. It is preferable to perform this addition gently and slowly with the containment of bubbles minimized, so as to enclose the first layer of the hydrogel in which either one of the retinal pigment epithelial cell sheet and the neural retina loaded in the first step is embedded, and the other one of the retinal pigment epithelial cell sheet and the neural retina, and so as not to break the positional relationship therebetween.

(6) In the sixth step, cooling can be performed in the same manner as in the third step.

In an embodiment, the method for producing the composite of the present invention may further comprise, after the sixth step, (7) a seventh step of preserving the composite at from 10° C. to 20° C. A low-temperature state imposes stress on cells, whereas if the temperature is elevated, it is more difficult to handle the hydrogel due to dissolution and/or reduction in jelly strength. Thus, (7) in the seventh step, the temperature at which the composite is preserved is, for example, from 8° C. to 25° C., preferably from 10° C. to 20° C. In the seventh step, cooling may be further performed after fixation. The cooling temperature may be a temperature lower by 5° C. to 15° C. (preferably a temperature lower by 10° C. to 15° C.) than the melting point.

For the two-stage embedding method mentioned above, it is preferred to first embed the retinal pigment epithelial cell sheet in the hydrogel.

In an embodiment, the production method according to the present invention is a one-stage embedding method comprising:

(1) a first step of loading the retinal pigment epithelial cell sheet and the neural retina into a container;
(2) a second step of adding a hydrogel in a fluid state to the container loaded with the retinal pigment epithelial cell sheet and the neural retina; and
(3) a third step of solidifying the hydrogel by cooling so as to embed the whole of the retinal pigment epithelial cell sheet and the neural retina to form a hydrogel layer having the retinal pigment epithelial cell sheet, the neural retina and the hydrogel.

In the first step, the loading is performed while the position is adjusted using tweezers such that the tangent directions of the respective surfaces of the retinal pigment epithelial cell sheet and the neural retina are approximately parallel and the apical surface of the neural retina and the apical surface of the retinal pigment epithelial cells face each other. By the loading in this condition, transplantation is achieved in orientation similar to that of a retina in vivo.

The second step and the third step may be carried out as described in the two-stage embedding method. The method may further comprise the seventh step of the two-stage embedding method.

[Pharmaceutical Composition, Therapeutic Medication and Treatment Method]

One aspect of the present invention is a pharmaceutical composition comprising a composite obtainable in the present invention as an active ingredient. The pharmaceutical composition comprises the composite of the present invention and preferably further comprises a pharmaceutically acceptable carrier.

The pharmaceutical composition can be used in the treatment of a disease caused by a disorder of a retinal tissue or a damage of a retinal tissue. Examples of the disease caused by the disorder of a retinal tissue include ophthalmic diseases such as retinal degenerative diseases, macular degeneration, age-related macular degeneration, retinitis pigmentosa, glaucoma, corneal diseases, retinal detachment, central serous chorioretinopathy, cone dystrophy, and cone rod dystrophy. Examples of the damage condition of a retinal tissue include a condition in which photoreceptor cells and retinal pigment epithelial cells die of degeneration.

As the pharmaceutically acceptable carrier, a physiological aqueous solvent (physiological saline, buffer, serum-free medium, etc.) can be used. If necessary, the pharmaceutical composition may be blended with a preservative, a stabilizer, a reducing agent, a tonicity agent, and the like which are usually used in a medicine containing tissues or cells to be transplanted in medical transplantation.

One aspect of the present invention is a therapeutic medication for a disease caused by the disorder of a retinal tissue or the damage of a retinal tissue, comprising a composite obtainable in the present invention.

The therapeutic medication of the present invention can treat the disorder condition of a retinal tissue or the damage condition of a retinal tissue by transplanting a composite obtainable in the present invention to a patient having a disease caused by the disorder of a retinal tissue or the damage of a retinal tissue. Examples of the disease caused by the disorder of a retinal tissue or the damage of a retinal tissue include the diseases mentioned above.

One aspect of the present invention is a composition for transplantation comprising a composite obtainable in the present invention. The composite of the present invention can be used for transplanting it to the eye fundus or into the subretinal space (subretinally) in a patient. The composite of the present invention can be used for transplanting it such that the composite is engrafted in the recipient patient in a condition in which the neural retina of the transplanted composite faces the neural retinal layer of the patient while the retinal pigment epithelial cell sheet of the transplanted composite faces the retinal pigment epithelial layer of the patient. The composition for transplantation comprises the composite of the present invention and preferably further comprises a pharmaceutically acceptable carrier. The pharmaceutically acceptable carrier is as mentioned above.

One aspect of the present invention is a method for treating a disease caused by the disorder of a retinal tissue or the damage of a retinal tissue, comprising the steps of:
(1) transplanting a composite obtainable in the present invention to the eye fundus or into the subretinal space (subretinally) in a patient; and
(2) engrafting the composite in vivo in the patient in a condition in which the neural retina of the transplanted composite faces the neural retinal layer of the patient while the retinal pigment epithelial cell sheet of the transplanted composite faces the retinal pigment epithelial layer of the patient.

One aspect of the present invention is a method for treating a disease caused by the disorder of a retinal tissue or the damage of a retinal tissue, comprising transplanting a composite obtainable in the present invention to a subject in need of transplantation (e.g., subretinally to an eye having the ophthalmic disease). As the therapeutic medication for a disease caused by the disorder of a retinal tissue, or in order to make up for a corresponding damaged segment in the damage condition of the retinal tissue, the composite of the present invention can be used. The disease caused by the disorder of a retinal tissue, or the damage condition of a retinal tissue can be treated by transplanting the composite of the present invention to a patient having the disease caused by the disorder of a retinal tissue, or a patient with the damage condition of a retinal tissue, in need of transplantation, and making up for the damaged retinal tissue. Examples of a transplantation method include a method of subretinally transplanting the composite of the present invention for transplantation to an injured site through an incision to an eyeball. Examples of a method for transplantation include a method of performing infusion using a thin tube, and a method of performing transplantation by sandwiching between tweezers, and examples of the thin tube include injection needles.

EXAMPLES

Hereinafter, the present invention will be described in detail with reference to Examples. However, the present invention is not limited by these by any means.

Example 1 Preparation of Retinal Pigment Epithelial Cell Sheet (RPE Cell Sheet) and Neural Retina from Human ES Cells by SFEBq Method Genetically modified human ES cell line (KhES-1 strain, (Non Patent Literature 3)) having Crx::Venus reporter gene were cultured under feeder-free conditions in accordance with the method described in "Scientific Reports, 4, 3594 (2014)". As a feeder-free medium, StemFit medium (trade name: AK03N, manufactured by Ajinomoto Co., Inc.) was used, and as a scaffold as an alternative to feeder cells, Laminin511-E8 (trade name, manufactured by Nippi, Inc.) was used.

Specific operation of maintenance culture of the human ES cells was carried out as follows: First, human ES cells reached sub-confluency (wherein about 60% of the culture area is covered by cells) were washed with PBS and dissociated into single cells using TrypLE Select (manufactured by Life Technologies). Then, dissociated human ES single cells were seeded in plastic culture dishes coated with Laminin 511-E8 and cultured in StemFit medium under feeder-free conditions with Y27632 (ROCK inhibitor, 10 µM). When 6-well plates (for cell culture, culture area: 9.4 cm², manufactured by AGC TECHNO GLASS, LTD) were used as the plastic culture dishes, the number of separated human ES single cells to be seeded was specified as 0.4 to $1.2 \times 10^4$ cells per well. One day after seeding, the medium was replaced to StemFit medium without Y27632. Thereafter, the medium was replaced StemFit medium without Y27632 once every 1 to 2 days. Thereafter, the cells were cultured in the absence of feeder cells (under feeder-free conditions) until 1 day before reaching sub-confluency. The human ES cells the 1 day before the sub-confluency were then cultured for 1 day (preconditioning treatment) under feeder-free conditions in the presence of SB431542 (TGFβ signaling pathway inhibitor, 5 µM) and SAG (Shh signaling pathway agonist, 300 nM).

After washing with PBS, human ES cells were treated for cell dispersions using TrypLE Select, and further dissociated into single cells by pipetting. Thereafter, the dissociated human ES single cells were suspended in 100 µl of a serum-free medium such that the density of cells per well of a non-cell adhesive 96-well culture plate (trade name: PrimeSurface, 96-well V-bottom plate, manufactured by Sumitomo Bakelite Co., Ltd.) was $1.2 \times 10^4$ cells, and subjected to suspension culture at 37° C. and 5% $CO_2$. The serum-free medium (gfCDM+KSR) used herein is a serum-free medium prepared by adding 10% KSR and 450 µM 1-monothioglycerol and 1× Chemically defined lipid concentrate to a mixture of culture fluids containing F-12 medium and IMDM medium in a ratio of 1:1.

At the initiation of the suspension culture (Day 0 from initiation of the suspension culture), Y27632 (ROCK inhibitor, final concentration: 10 µM) and SAG (Shh signaling pathway agonist, 300 nM, 30 nM or 0 nM) were added to the serum-free medium. At Day 3 from initiation of the suspension culture, 50 µL of a medium containing exogenous human recombinant BMP4 (final concentration: 1.5 nM) was added using a medium, which did not contain Y27632 or SAG and contained human recombinant BMP4 (trade name: Recombinant Human BMP-4, manufactured by R&D). Day 6 or later from initiation of the suspension culture, a half of the medium was exchanged with a culture medium, which did not contain Y27632, SAG or human recombinant BMP4, once every 3 days. Both the methods for producing the neural retina and the RPE cell sheet were carried out in the same manner up to this point.

(Method for Producing Neural Retina)

The aggregates of Days 15 to 18 from initiation of the suspension culture were transferred to a 90-mm low adhesive plate (manufactured by Sumitomo Bakelite Co., Ltd.) and cultured at 37° C. under 5% $CO_2$ for 3 to 4 days in a serum-free medium (DMEM/F12 medium supplemented with 1% N2 Supplement) containing a Wnt signaling pathway agonist (CHIR99021, 3 µM) and a FGF signaling pathway inhibitor (SU5402, 5 µM). Thereafter, the aggregates were cultured for a long term in a DMEM/F12 medium, which did not contain the Wnt signaling pathway agonist or the FGF signaling pathway inhibitor and contained serum (hereinafter, also referred to as NucT0 medium), in a 90-mm low adhesive plate (manufactured by Sumitomo Bakelite Co., Ltd.). Day 40 or later from initiation of the suspension culture (differentiation), the aggregates were cultured for a long term in a serum medium, which did not contain the Wnt signaling pathway agonist or the FGF signaling pathway inhibitor (mixed medium of the NucT0 medium and NucT2 medium; hereinafter, also referred to as NucT1 medium). Day 60 or later from initiation of the suspension culture (differentiation), the aggregates were cultured for a long term (up to about Days 80 to 150 from initiation of the suspension culture) in a neurobasal medium containing thyroid gland hormone signaling pathway agonist T3 (hereinafter, also referred to as NucT2 medium) to obtain a sphere-like neural retina and PRE cells. The neural retina and the RPE cells were picked up. The sphere-like human ES cell-derived RPE was dissected and cut open into a one-layer sheet using ophthalmic scissors to obtain a RPE cell sheet.

As a result of observation under a microscope, it was found that the human ES cell strain differentiated into a neural retina (NR) having a layer structure and RPE cells (A and B of FIG. 1).

These sphere-like RPE cells were allowed to adhere to a dish coated with iMatrix511, and cultured in DMEM/F12 medium containing B27 and 200 mM L-glutamine (referred to as SFRM medium) supplemented with SB431542 (FUJI-FILM Wako Pure Chemical Corp.) and bFGF (FUJIFILM Wako Pure Chemical Corp.). After expansion culture, favorable portions of RPE cells were picked up and subcultured. After expansion culture, RPE cells was cryopreserved in STEM-CELLBANKER® (Nippon Zenyaku Kogyo Co., Ltd.). The cryopreserved RPE cells was subjected to expansion culture against on a dish coated with iMatrix511. After collagen gelation using be Matrix collagen solution with a low endotoxin level (Nitta Gelatin Inc., CollagenAT), RPE was cultured in F10 medium (Sigma-Aldrich Co. LLC) supplemented with 10% FBS for 1 month, and then cultured in SFRM medium supplemented with SB431543 and bFGF. As a result, it was found that a RPE cell sheet having a hexagonal structure was able to be prepared (C of FIG. 1). The RPE cell sheet thus prepared can be isolated by digesting the collagen gel using collagenase (F. Hoffmann-La Roche, Ltd.). In the following Examples, a retinal pigment epithelial cell sheet (RPE cell sheet) and a neural retina were produced in the same manner as in Example 1.

Example 2 Study on Experimental Conditions—Concentration and Meltability of Gelatin For gelatin transplantation into subretinal space, it is preferable that gelatin should be transplanted at a concentration as low as possible and rapidly dissolved and absorbed and/or degraded. On the other hand, gelatin becomes difficult to handle if immediately melted during transplantation. Hence, the optimum concentration was studied.

Gelatin LS-W (manufactured by Nitta Gelatin Inc.) was dissolved at 37° C. using HBSS (manufactured by Gibco/Thermo Fisher Scientific Inc.) such that the concentration was 10% by weight, 15% by weight, 20% by weight, 25% by weight, or 30% by weight. Several drops of each solution were added onto a glass slide. After the dropwise addition, the glass slide was incubated in a refrigerator of 4° C. for 30 minutes. The glass slide thus incubated was placed in a vertical fashion at room temperature (25° C.) for 5 minutes. Meltability was studied by using running down as an index.

As a result, in the case of the concentrations of 10% by weight, 15% by weight, and 20% by weight, it was found that gelatin was rapidly melted at room temperature. On the other hand, in the case of the concentrations of 25% by weight or more, it was found that gelatin remained solid at room temperature. Thus, Example 3 or later was carried out using gelatin at a concentration of 30% by weight.

Example 3 Study on Experimental Conditions—Temperature at which Gelatin is Melted The dissolution temperature of gelatin LS-W (manufactured by Nitta Gelatin Inc.) was studied. Gelatin LS-W was dissolved at 30% by weight using HBSS at 37° C. and incubated at 4° C., 16° C., 26° C., or 37° C. for 1 day. The storage at 4° C. was carried out in a refrigerator, and the storage at 16° C., 26° C. and 37° C. was carried out in a $CO_2$ incubator set to each temperature.

As a result of observation 1 day later, gelatin remained solid at 4° C. and 16° C. whereas gelatin was completely dissolved at 26° C. and 37° C. Accordingly, it was found that the dissolution temperature of 30% by weight of gelatin L-SW is between 16° C. and 26° C.

Example 4 Study on Experimental Conditions—pH Adjustment and Meltability

30% by weight of gelatin LS-W (manufactured by Nitta Gelatin Inc.) dissolved in HBSS (manufactured by Gibco/Thermo Fisher Scientific Inc.) is acidic around pH 5.0 to 6.0 and may have cytotoxic effect such as acidosis on cells. Accordingly, 1 µL, 2 µL, 3 µL or 4 µL of 1.2 N NaOH was added to 100 µL of 30% by weight of gelatin L-SW to adjust pH to around 6, around 7, or around 8.

In order to study the presence or absence of change in the property (meltability) of gelatin adjusted to each pH, the gelatin was incubated, in a condition in which 5 to 10 human ES cell-derived neural retinas were embedded, for 1 day and 3 days in a 5% $CO_2$ incubator set to 16° C. As a result, gelatin adjusted to neutrality remained solid at 16° C. for 1 to 3 days. Thus, it was found that the characteristics of gelatin are not changed by pH adjustment to neutrality. Accordingly, it was found that gelatin LS-W (manufactured by Nitta Gelatin Inc.) does not largely vary in dissolution temperature in a neutral region. In Example 5 or later, pH was used around 7.

Example 5 Cytotoxicity Test of hES Cell-Derived Neural Retina Embedded in Gelatin Gelatin L-SW (manufactured by Nitta Gelatin Inc.) having the high concentration (30% by weight) and pH in an acidic region or a neutral region was studied for its influence on the survival and differentiation of cells. The hES cell-derived neural retina was embedded in 30% by weight of gelatin (pH 5 or pH 7) for 3 days and preserved at 16° C. Thereafter, the gelatin was melted by incubation at about 37° C., followed by recovery culture in a proliferation medium for 3 days, 9 days, or 14 days. Thereafter, the morphology of tissues and the expression of various markers, etc. were observed by immunostaining under a microscope.

Figure 2:
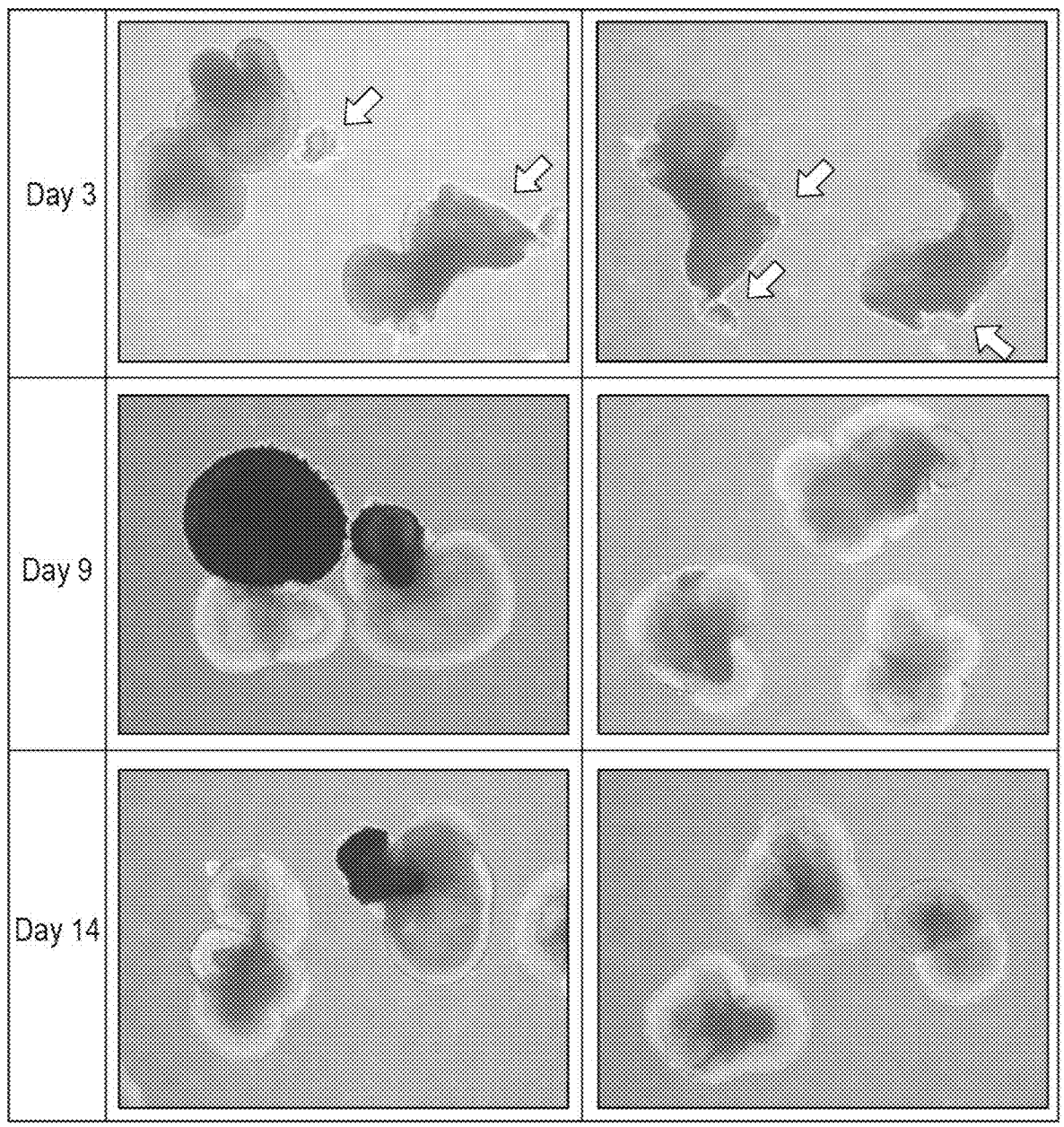
FIG. 2 is images showing results of microscopically observing the morphology of a hES cell-derived neural retinas after embedding for 3 days in gelatin of pH 5 and recovery culture in Example 5.
Figure 3:
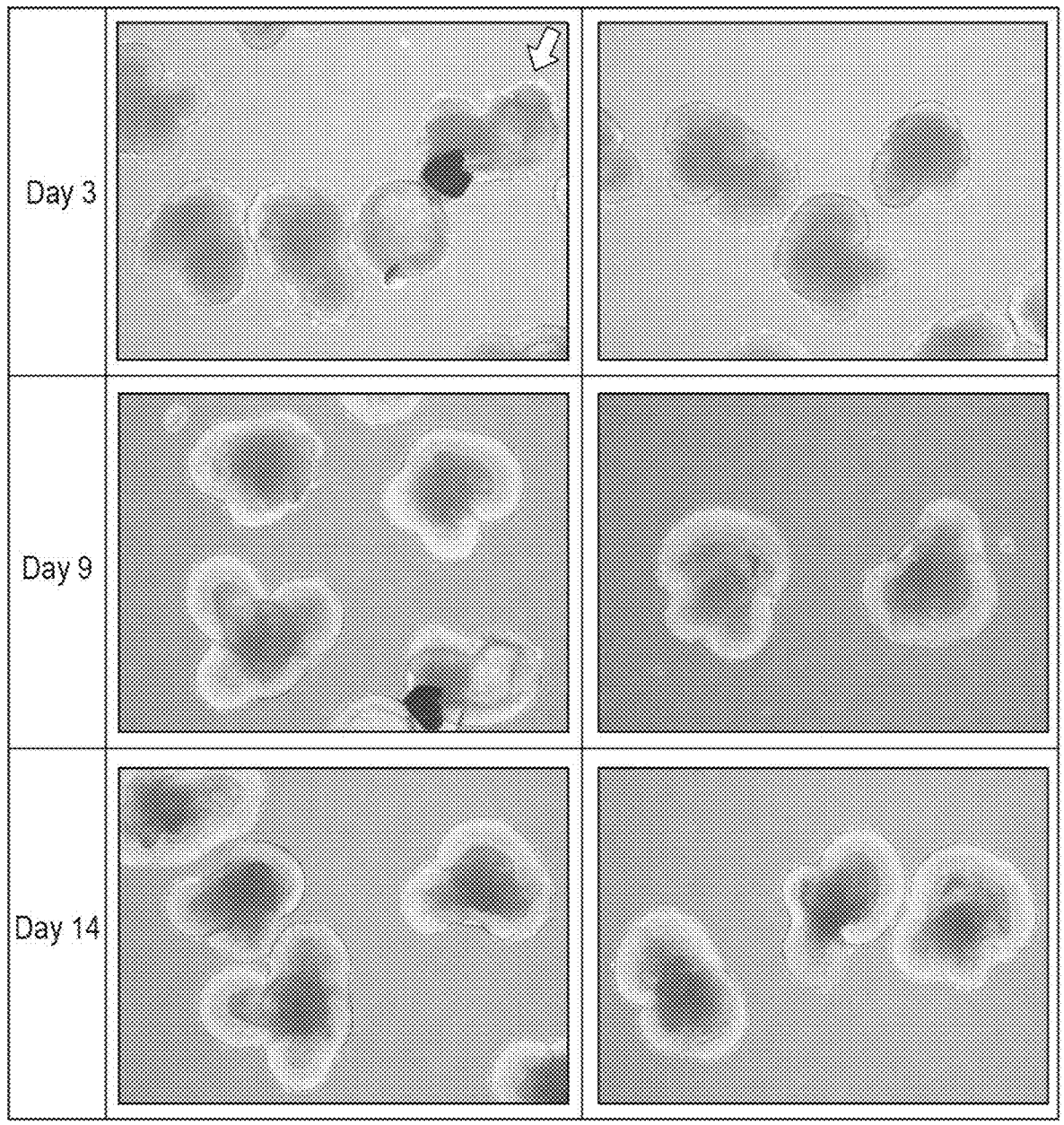
FIG. 3 is images showing results of microscopically observing the morphology of a hES cell-derived neural retina after embedding for 3 days in gelatin of pH 7 and recovery culture in Example 5.

As a result of observing the morphology of tissues under a microscope, it was found that the human ES cell-derived neural retina embedded in 30% by weight of gelatin for 3 days and preserved at 16° C. slightly exhibited cell death or a disrupted layer structure after 3-day culture (FIGS. 2 and 3, arrows), but the structures were recovered after culture for 9 days or more (FIGS. 2 and 3). Since gelatin of pH 5 caused strong immediate damage, it was able to be confirmed that gelatin around neutrality is preferable (FIG. 2).

Figure 4:
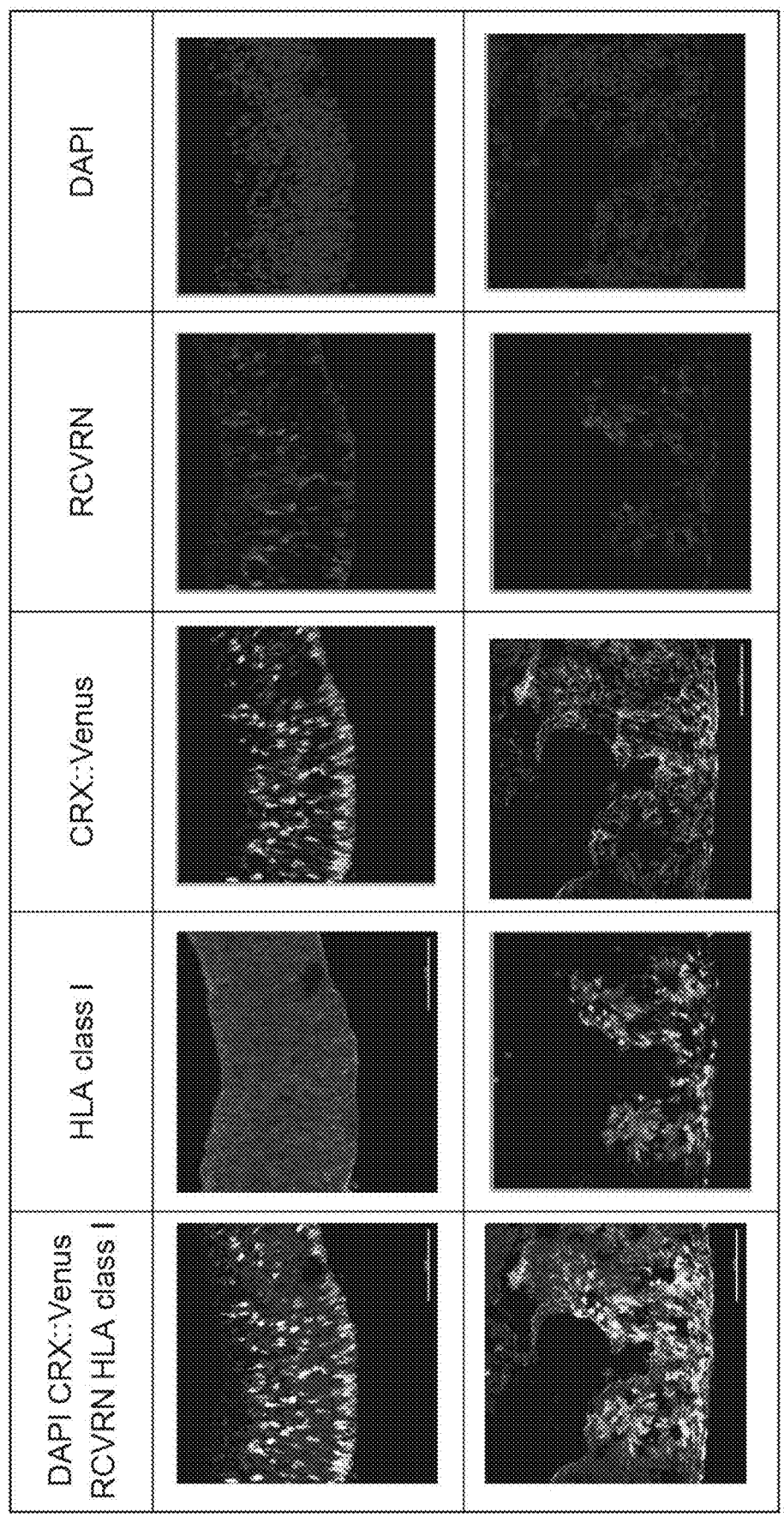
FIG. 4 is fluorescence microscope images showing results of performing immunostaining on hES cell-derived neural retinas with DAPI, Recoverin (RCVRN) and HLA class I, and the fluorescence of CRX::Venus (pH 5) in Example 5.
Figure 5:
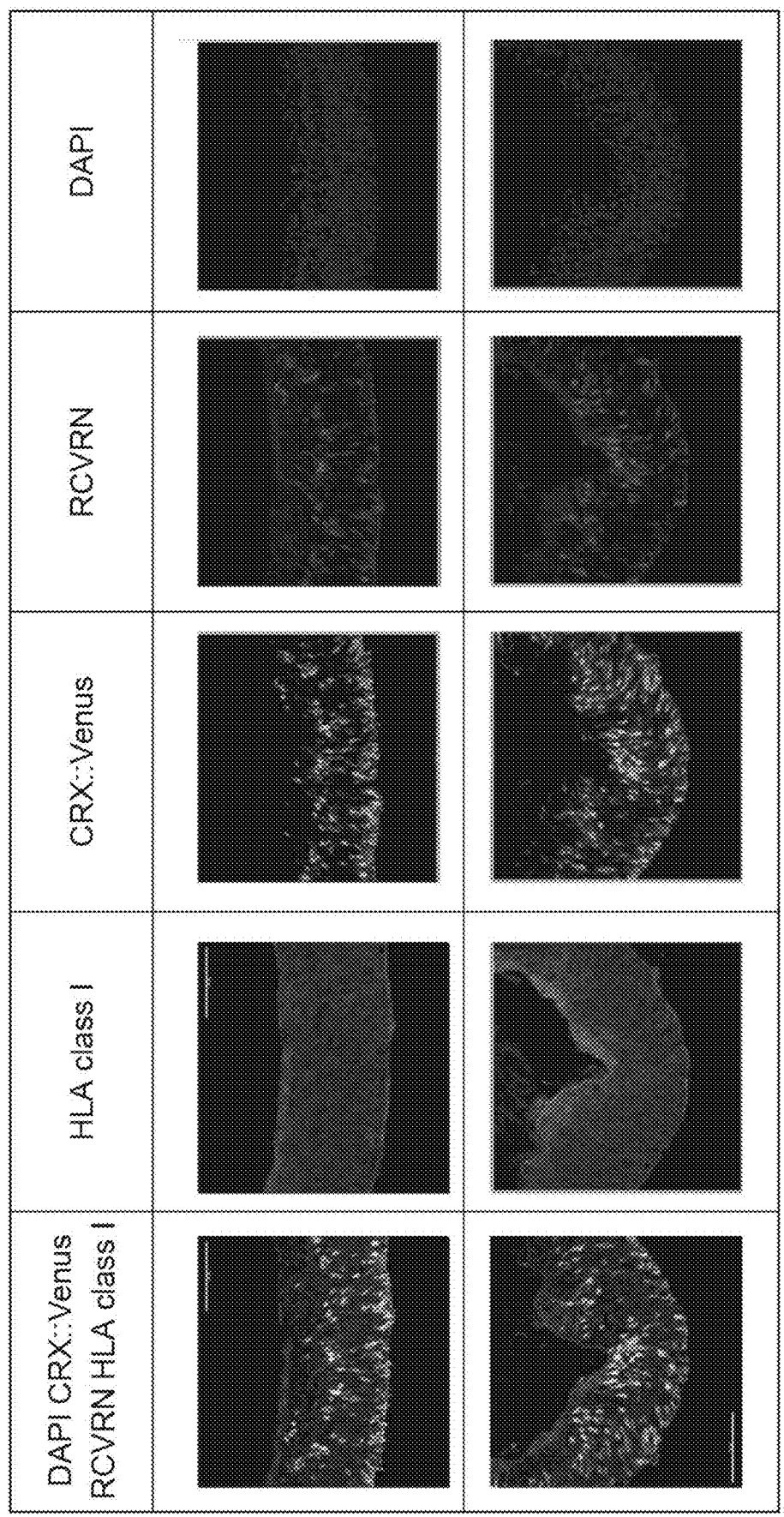
FIG. 5 is fluorescence microscope images showing results of performing immunostaining on hES cell-derived neural retinas with DAPI, Recoverin (RCVRN) and HLA class I, and the fluorescence of CRX::Venus (pH 7) in Example 5.

It is known that HLA class 1 is not expressed in neural retinas under usual conditions, whereas its expression is elevated under inflammatory conditions. Accordingly, the morphology of the hES cell-derived neural retina and the HLA class I expression levels were compared between gelatin of pH 5 and gelatin of pH 7 by embedding therein, storage, and recovery culture for 14 days. As a result, in the case of embedding and storage in gelatin of pH 5, the layer structure and continuous epithelium structure of the hES cell-derived neural retina were well kept and recoverin-positive photoreceptor cells were confirmed, whereas a portion of the continuous epithelium structure disrupted and formed a rosette (FIG. 4). The expression of HLA class I was increased in the rosette, suggesting the possibility of damage due to the acidity of gelatin. On the other hand, in the case of embedding and storage in gelatin of pH 7, the layer structure of the hES cell-derived neural retina was well kept and many recoverin-positive photoreceptor cells were confirmed (FIG. 5). The expression of HLA class I was not observed (FIG. 5).

Figure 7:
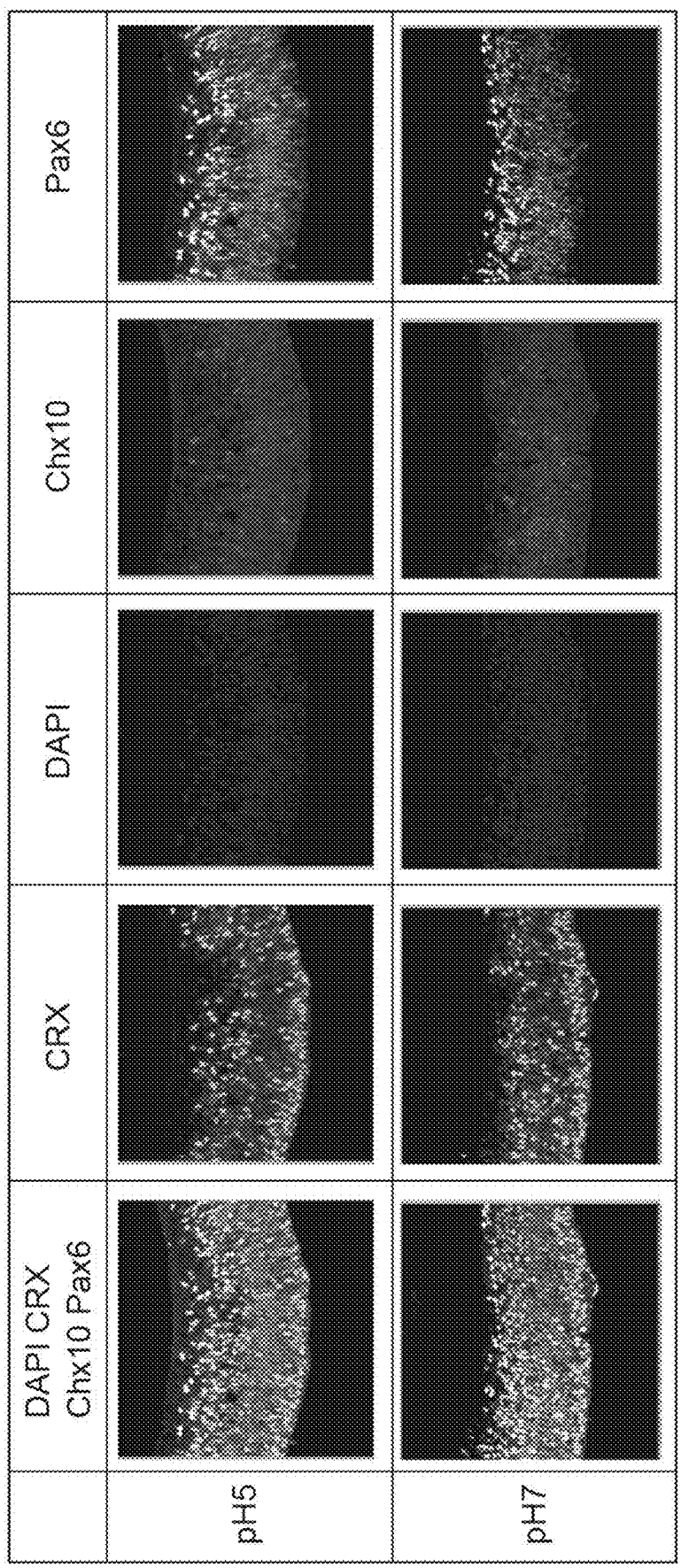
FIG. 7 is fluorescence microscope images showing results of performing immunostaining on hES cell-derived neural retinas with DAPI, Chx10 and Pax6, and the fluorescence of CRX::Venus in Example 5.
Figure 8:
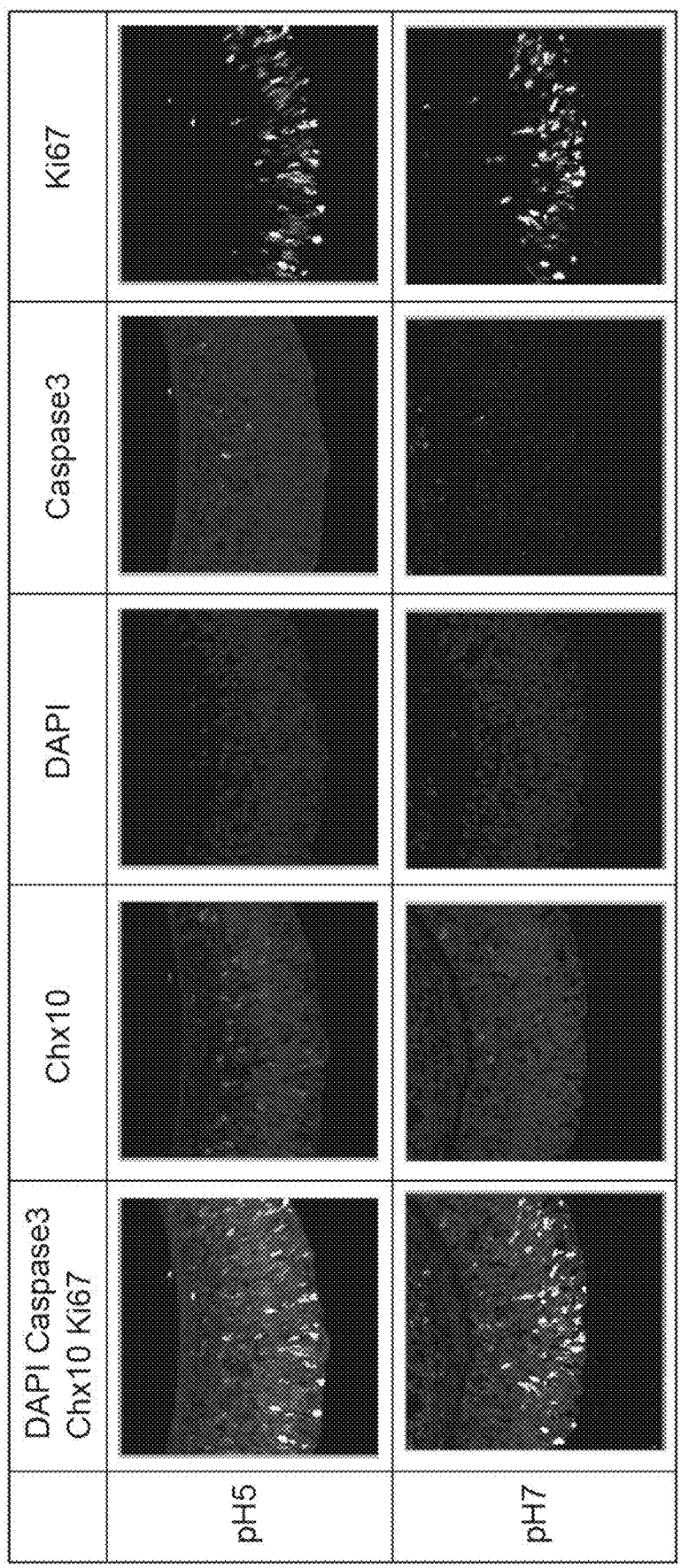
FIG. 8 is fluorescence microscope images showing results of performing immunostaining on hES cell-derived neural retinas with DAPI, Caspase3, Chx10 and Ki67.

Gelatin is obtained by degrading the basal membrane component collagen and was therefore studied next for the possibility of causing disrupt of the apical and basal polarity and layer structure (continuous epithelium structure) of the hES cell-derived neural retina, promotion of differentiation, or apoptosis, etc. by gelatin. Specifically, change in the apical and basal polarity of the human ES cell-derived neural retina after recovery culture for 14 days, the presence or absence of promotion of differentiation (confirmation of the presence of precursor cells) and the presence or absence of apoptosis induction were observed by immunostaining each marker. The results are shown in FIGS. 6 to 8.

Figure 6:
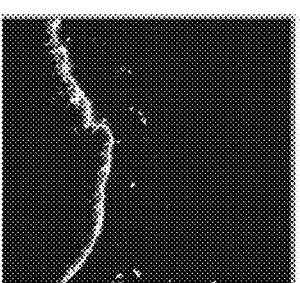
FIG. 6 is fluorescence microscope images showing results of performing immunostaining on hES cell-derived neural retinas with DAPI, Ezrin and Collagen-IV (ColIV), and the fluorescence of CRX::Venus in Example 5.

As a result, apical and basal polarity was kept, showing no influence of gelatin (Ezrin: apical marker, manufactured by R&D Systems, Inc., Col IV: collagen IV/basal marker, manufactured by Abcam plc) (FIG. 6). The localization of positive cells for each of the retina markers Crx (manufactured by Takara Bio Inc.), Chx10 (manufactured by Exalpha Biologicals Inc.) and Pax6 (manufactured by Becton, Dickinson and Company) was correctly maintained, showing no influence of gelatin (Crx: photoreceptor precursor cell, Chx10 & Pax6: retinal precursor cell, Pax6: amacrine cells) (FIG. 7). Retinal precursor cells were also present. Few active Caspase3 (manufactured by Becton, Dickinson and Company) positive apoptotic cells were observed, showing no influence of gelatin on apoptosis (FIG. 8). Such influence did not differ by difference in pH.

From the results described above, it was found that the human ES cell-derived neural retina embedded in gelatin for 3 days and preserved at 16° C. slightly exhibited damage immediately after melting of gelatin, but made a recovery without problems. Since gelatin of pH 5 caused strong immediate damage, it was able to be confirmed that gelatin around neutrality is preferable.

Example 6 Parallel Embedding of Human ES Cell-Derived Neural Retina in 30% by Weight of Gelatin LS-W A human ES cell-derived neural retina of Days 80 to 150 from initiation of suspension culture produced in the same manner as in Example 1 was dissected using ophthalmic scissors, provided as pieces having a transplantable size, and placed on a 60 cm dish (Sumitomo Bakelite Co., Ltd.), and the culture medium was removed. 20 to 30 uL of 30% by weight of gelatin LS-W (manufactured by Nitta Gelatin Inc.) heated to 37° C. was added dropwise thereto from above, and the pieces of the dissected neural retina were laterally arranged and cooled at 4° C. for 30 minutes. As a result, a plurality of grafts were able to be laterally continuously provided. It was found that a plurality of grafts can be simultaneously provided for transplantation by lateral arrangement after addition of gelatin.

Figure 9:
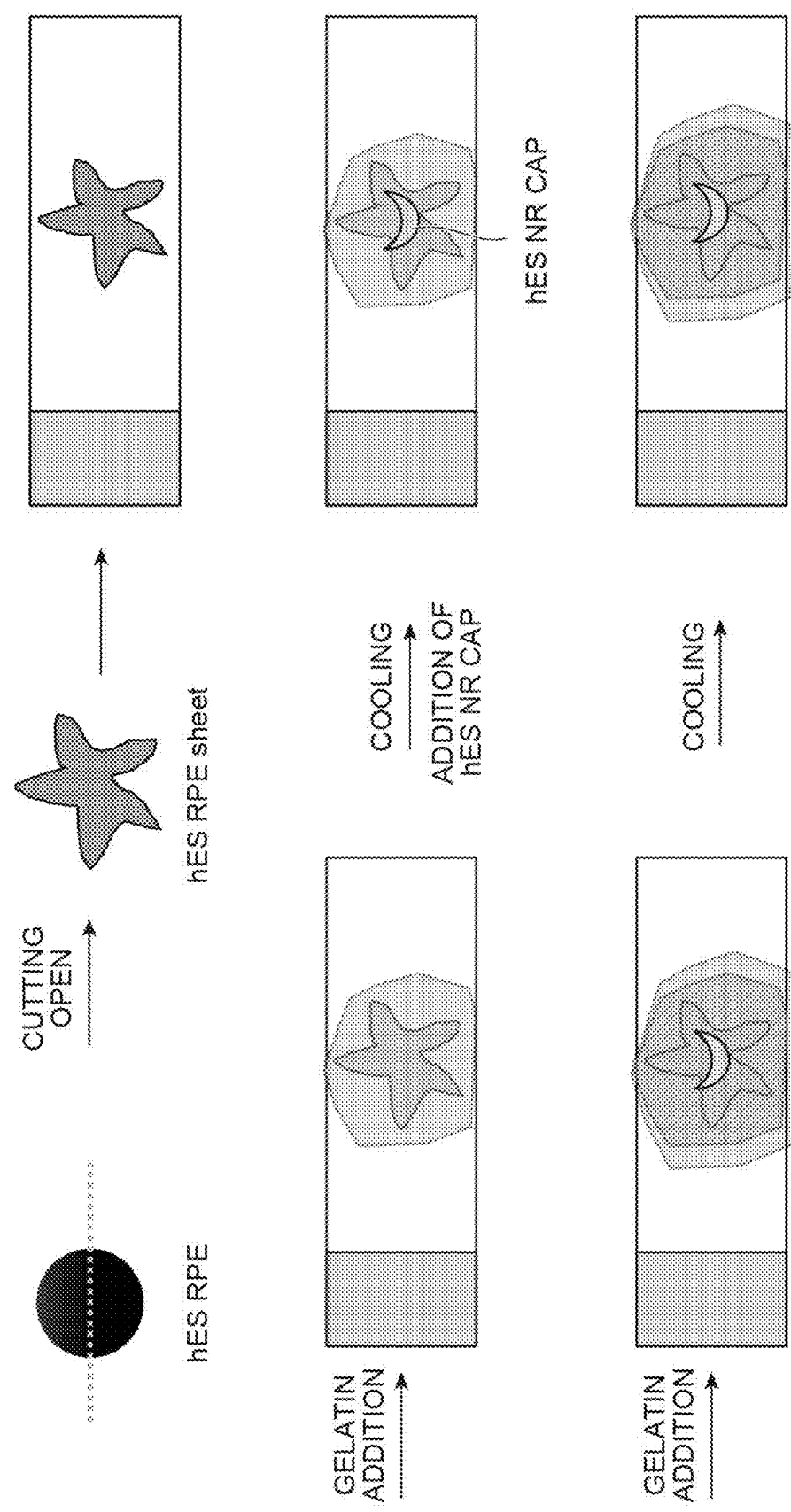
FIG. 9 is a conceptual view showing experimental procedures in Example 7.

Example 7 Two-Stage Embedding of Human ES Cell-Derived RPE and Human ES Cell-Derived Neural Retina in 30% by Weight of Gelatin LS-W A human ES cell-derived neural retina and a RPE cell sheet of Days 80 to 150 from initiation of suspension culture produced in the same manner as in Example 1 were provided. As a container for solidification in gelatin, 400 urn silicon sheets each made from two silicon sheets of 200 µm in thick were placed as spacers on both ends on a glass slide (Matsunami Glass Ind., Ltd.). The RPE cell sheet was left standing on the glass slide. 50 uL of 30% by weight of gelatin LS-W (manufactured by Nitta Gelatin Inc.) heated to 52° C. was added dropwise thereto from above, and a glass slide was put thereon and cooled at 4° C. for 20 minutes. After the cooling, the gel with RPE cells buried therein was peeled and inverted such that the apical surface of RPE cells were turned upward. A neural retina dissected from the neural retinal tissues prepared in Example 1 was placed on the RPE cell sheet such that its apical surface was turned downward (faced the RPE side). Gelatin LS-W of 52° C. was added dropwise thereto from above, and a glass cover was put thereon. Cooling at 4° C. was performed for 20 minutes. The procedures of Example 7 are shown in FIG. 9.

Figure 10:
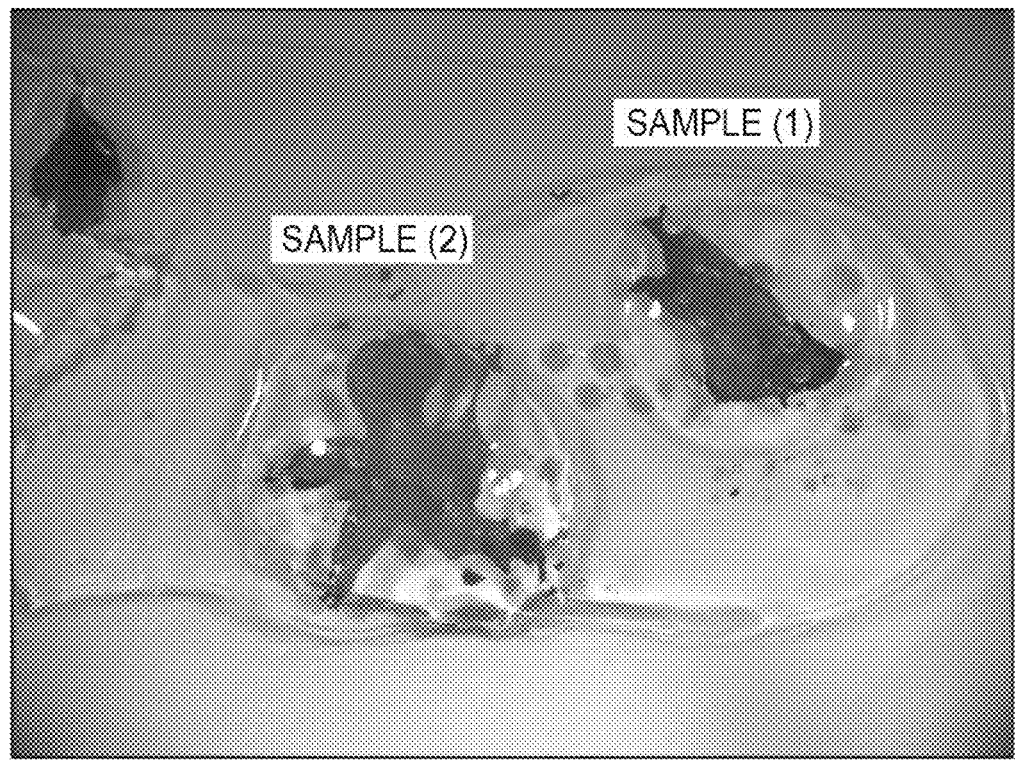
FIG. 10 is a photograph showing sample (1) and sample (2) having a neural retina (NR) sitting on a retinal pigment epithelium (RPE) sheet in Example 7.
Figure 11:
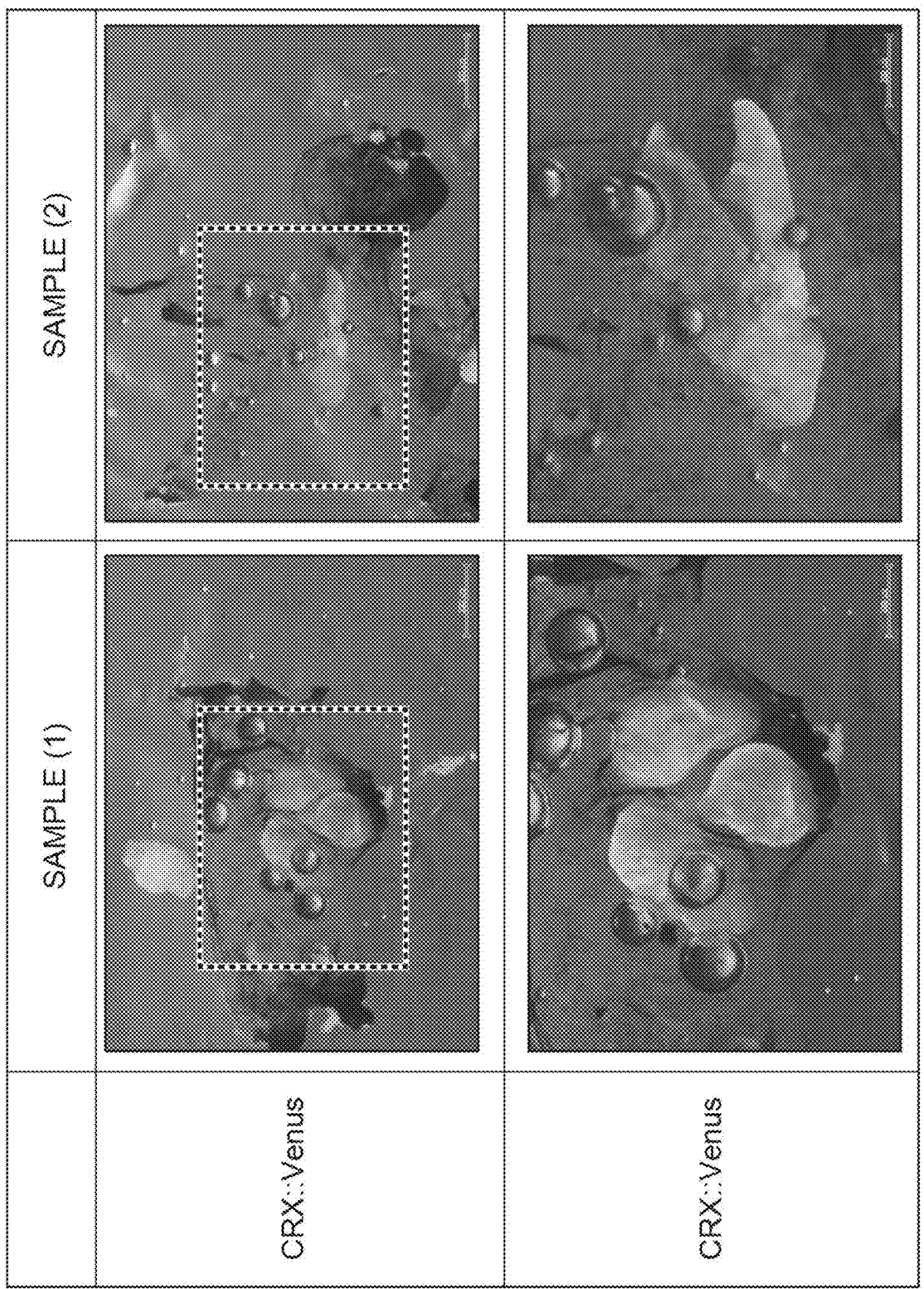
FIG. 11 is fluorescence microscope images showing the fluorescence of CRX::Venus in the sample (1) and the sample (2) having a neural retina (NR) sitting on a retinal pigment epithelium (RPE) cell sheet in Example 7.
Figure 12:
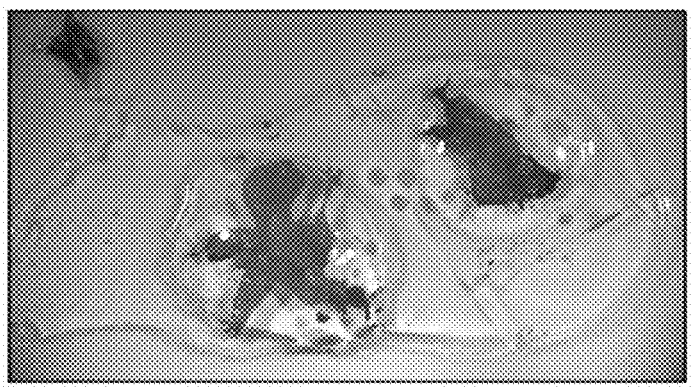
FIG. 12 is photographs showing procedures of dissection work of gelatin in Example 7.
Figure 12:
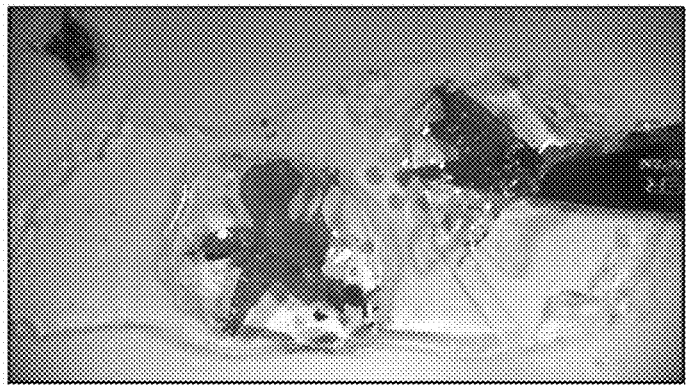
Figure 12:
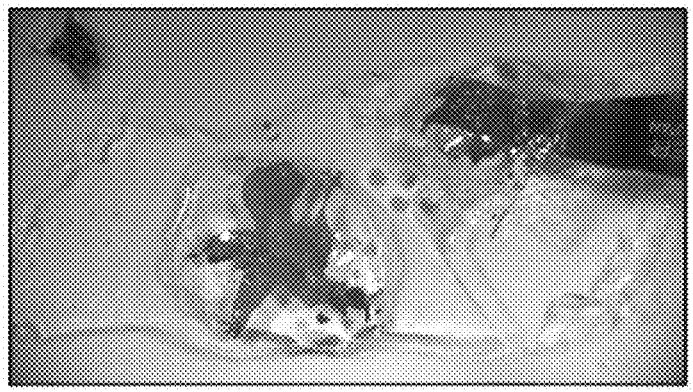
Figure 12:
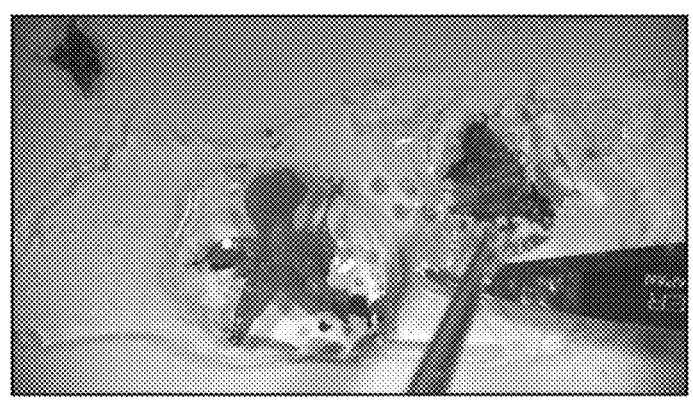
Figure 13:
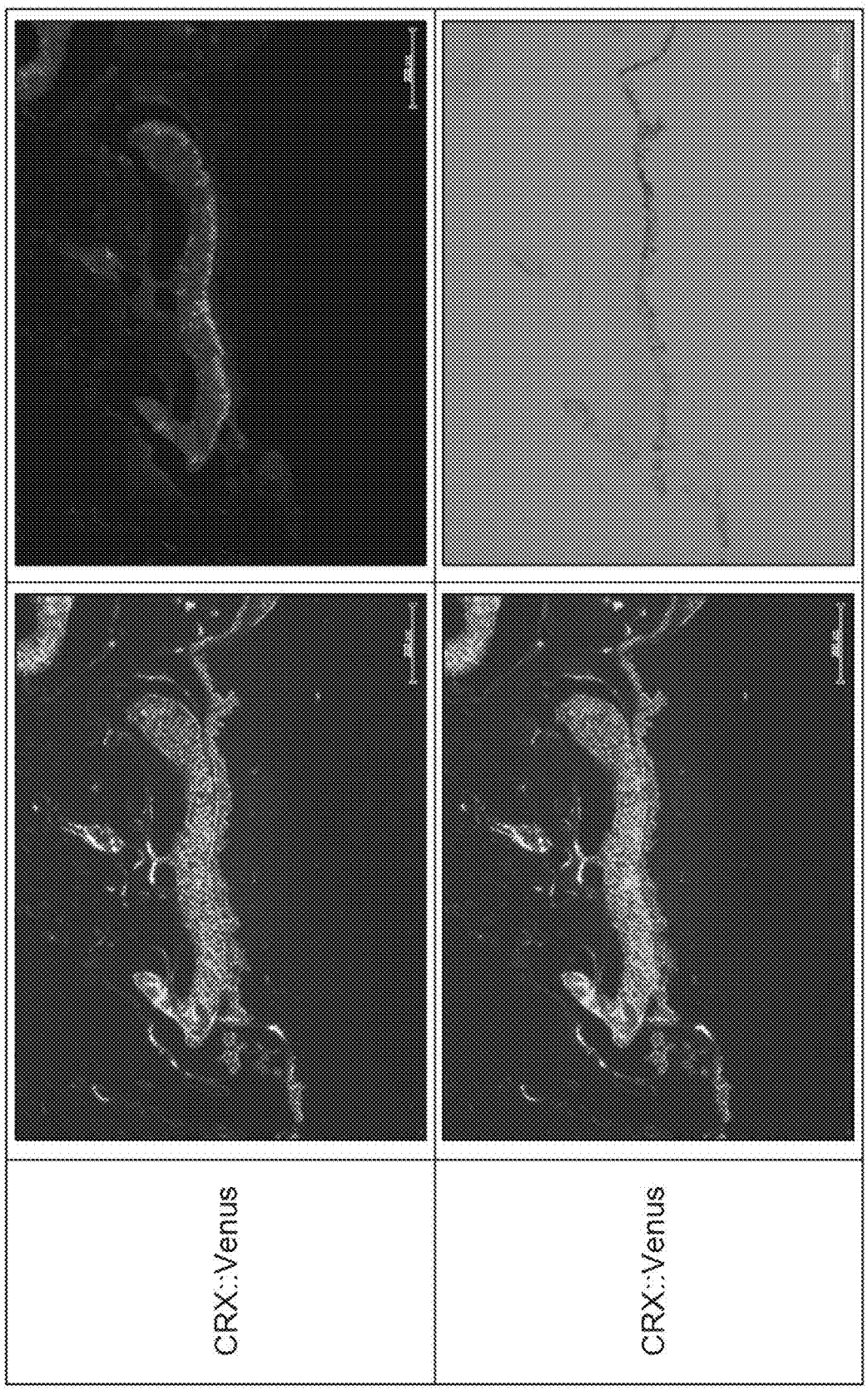
FIG. 13 is fluorescence microscope images showing the fluorescence of CRX::Venus on sections of a composite of embedded human ES cell-derived RPE and neural retina in Example 7.
Figure 14:
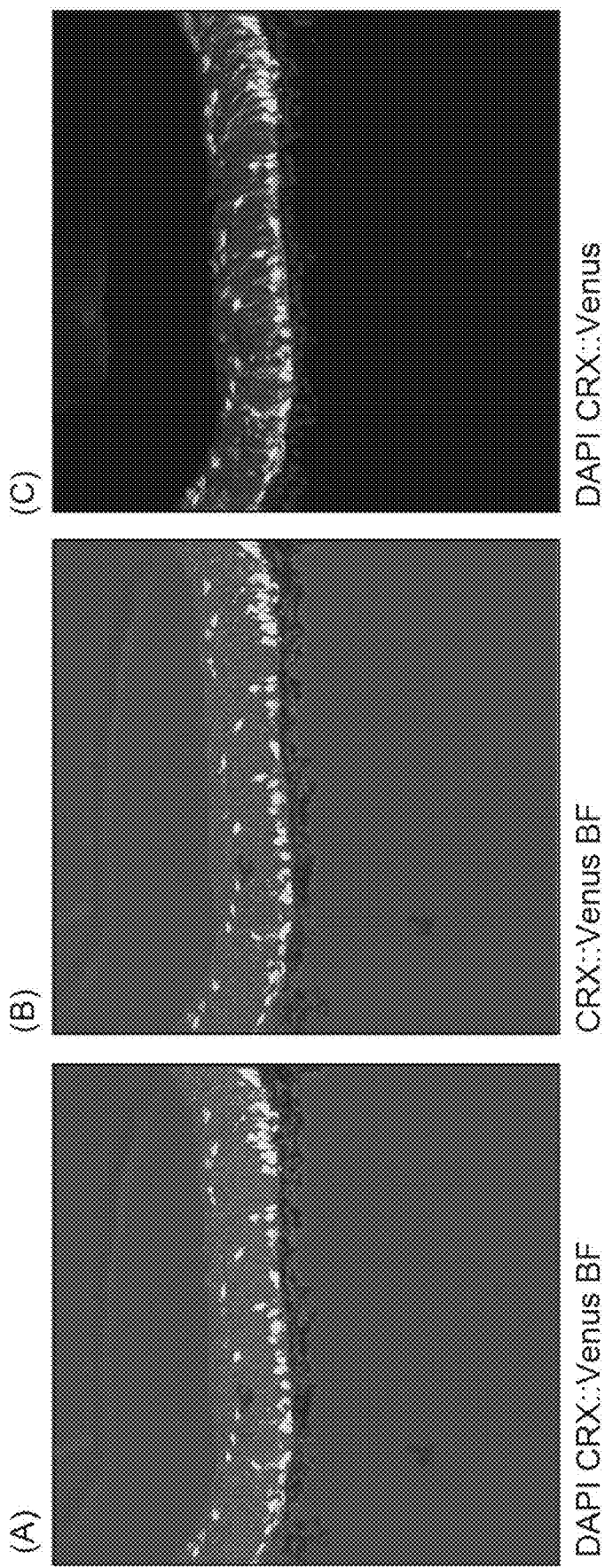
FIG. 14 is fluorescence microscope images showing results of performing staining with DAPI on sections of a composite of embedded human ES cell-derived RPE and neural retina immediately after gelatin adhesion, and the fluorescence of CRX::Venus in Example 7.
Figure 15:
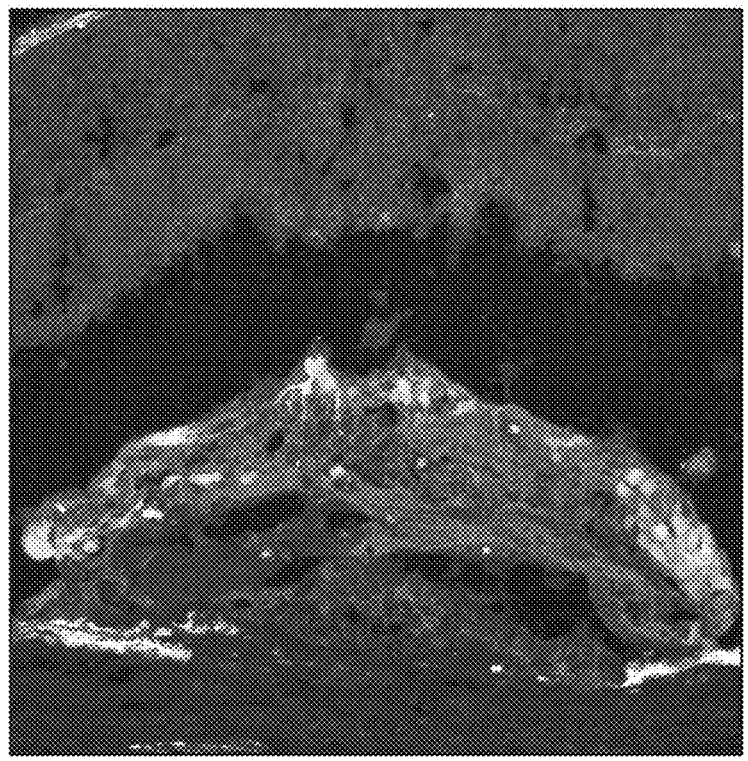
FIG. 15 is fluorescence microscope images showing results of performing immunostaining on human cells and RPE cells in tissue sections with DAPI, Stem121 and RPE65, and the fluorescence of CRX::Venus in Example 8.
Figure 15:
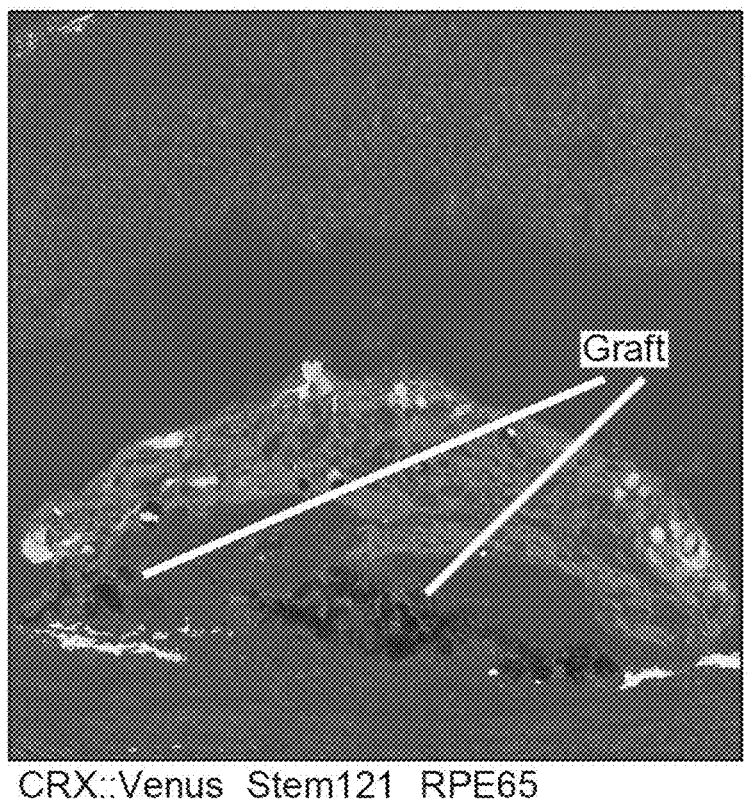
Figure 16:
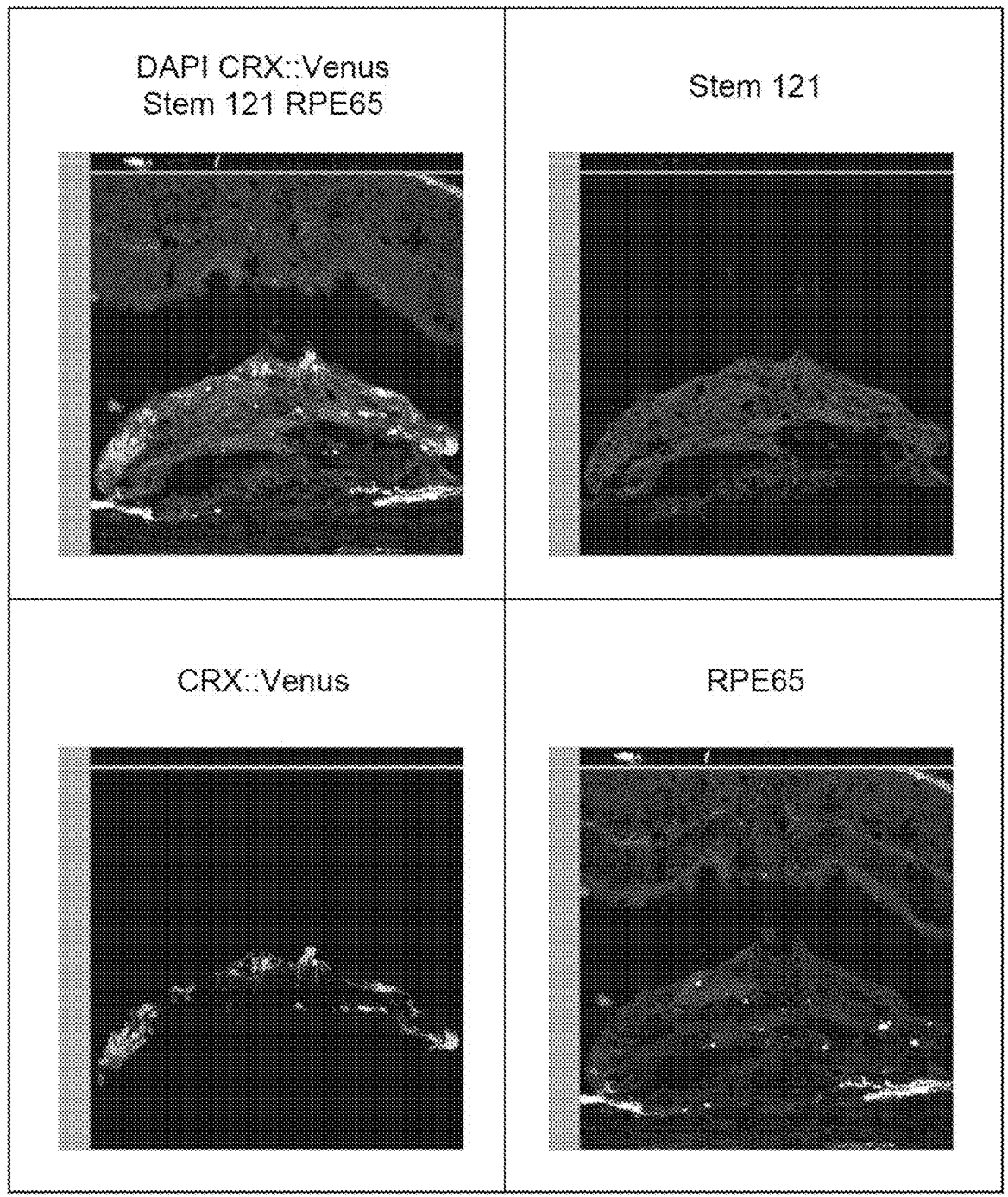
FIG. 16 is fluorescence microscope images showing results of performing immunostaining on human cells and RPE cells in tissue sections with DAPI, Stem121 and RPE65, and the fluorescence of CRX::Venus in Example 8.
Figure 17:
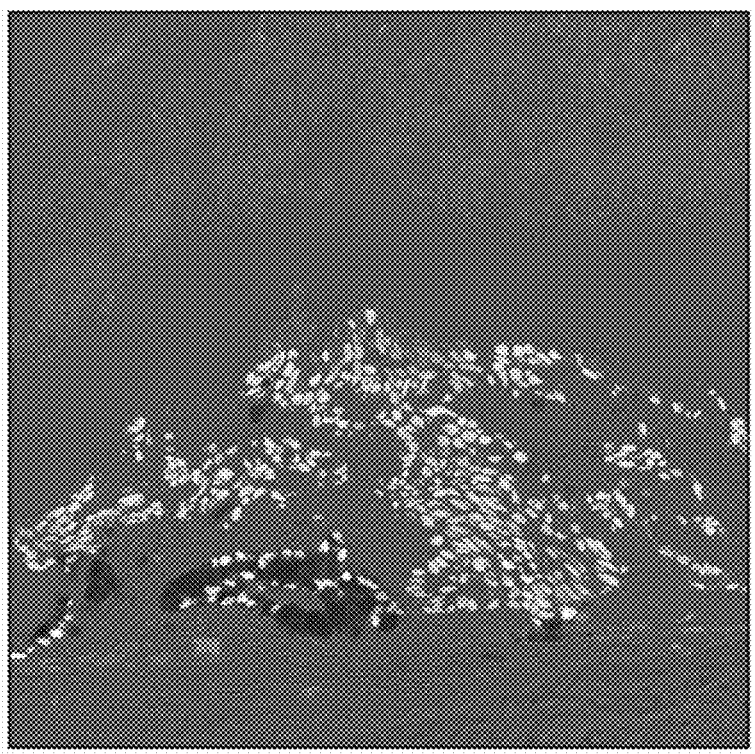
FIG. 17 is fluorescence microscope images showing results of performing immunostaining on human cells and RPE cells in tissue sections with DAPI, HuNu and MITF in Example 8.
Figure 17:
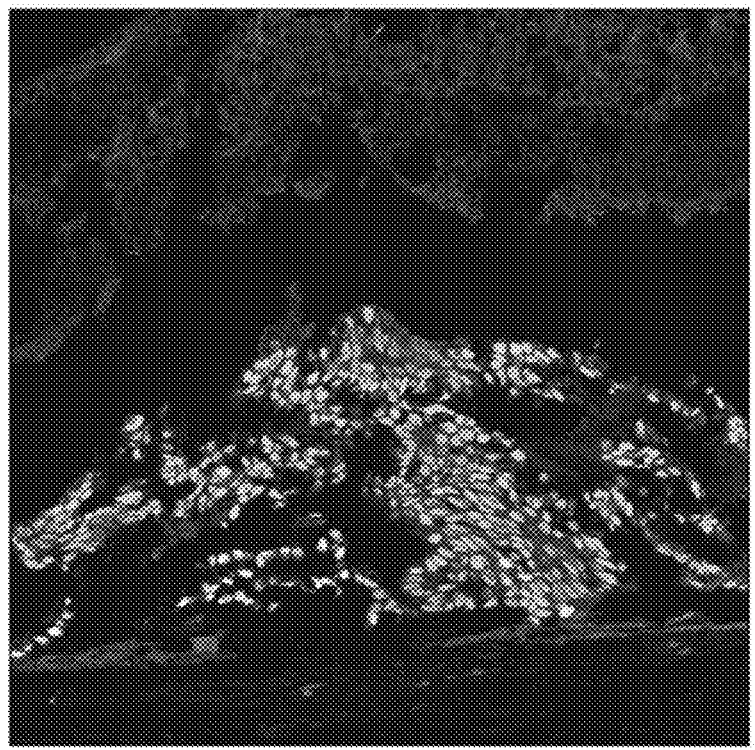
Figure 18:
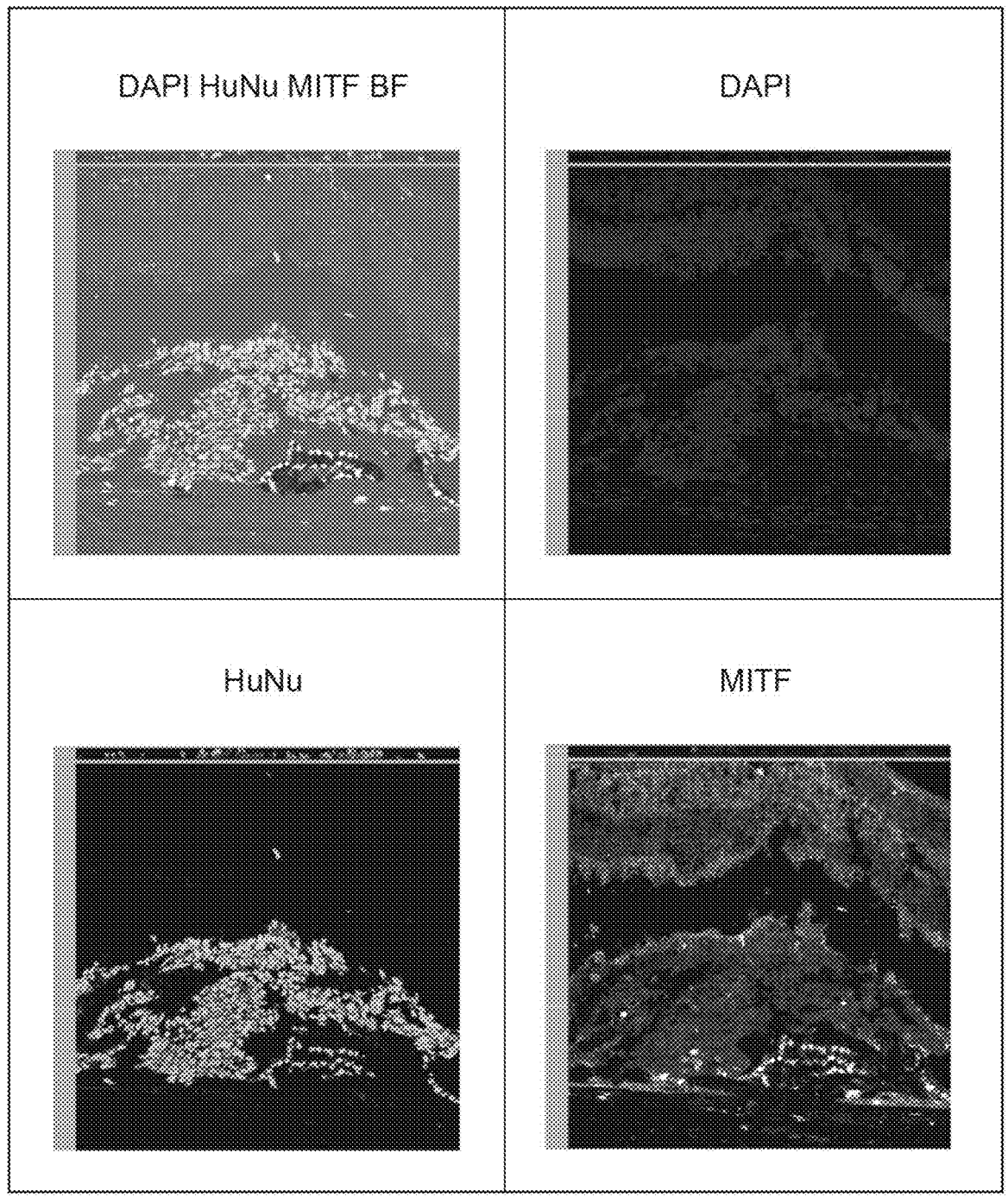
FIG. 18 is fluorescence microscope images showing results of performing immunostaining on human cells and RPE cells in tissue sections with DAPI, HuNu, MITF and Bright Field (BF) image in Example 8.
Figure 19:
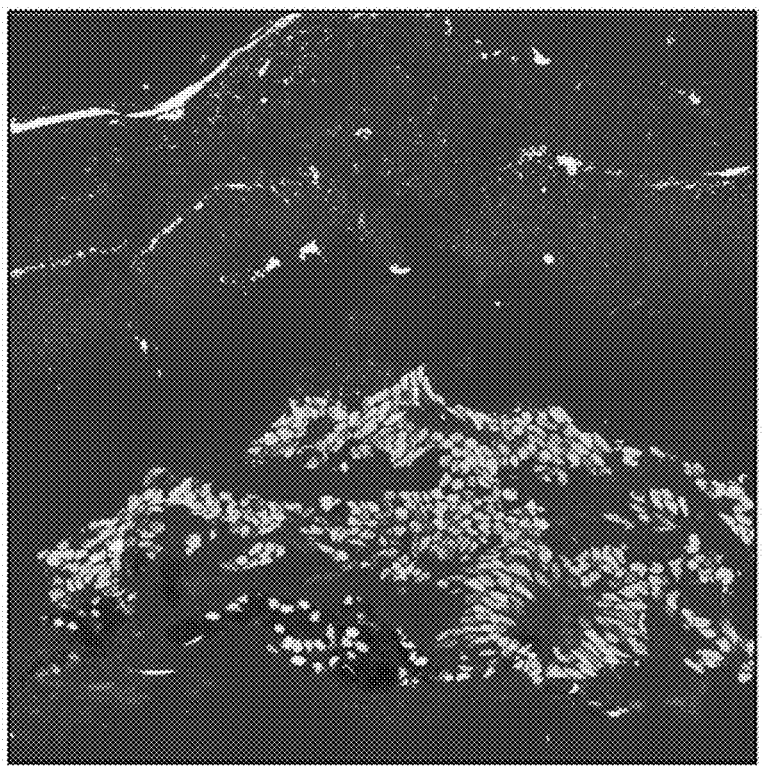
FIG. 19 is fluorescence microscope images showing results of performing immunostaining on human cells and RPE cells in tissue sections with DAPI, HuNu, MITF and Iba-1 in Example 8.
Figure 19:
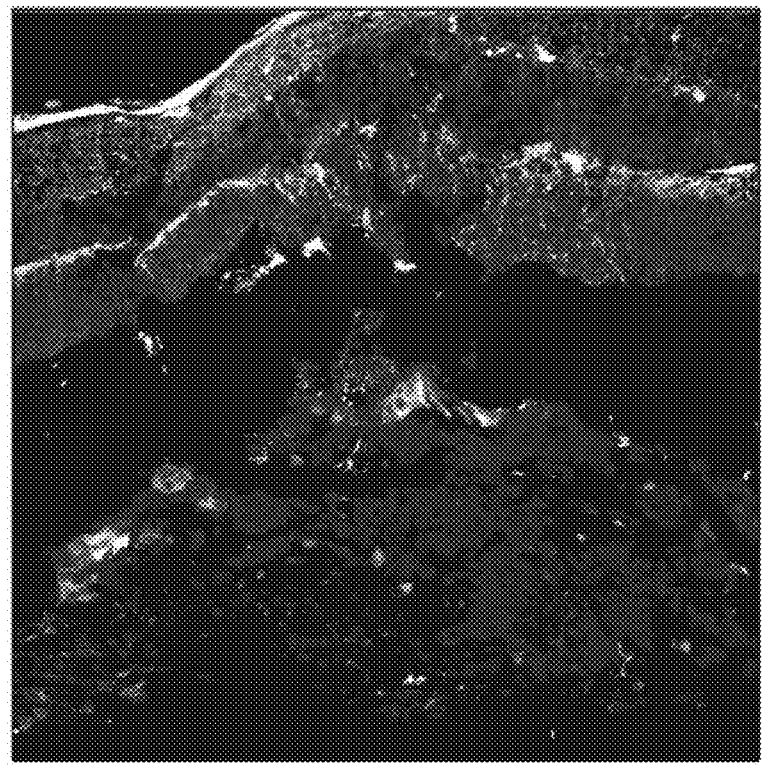
Figure 20:
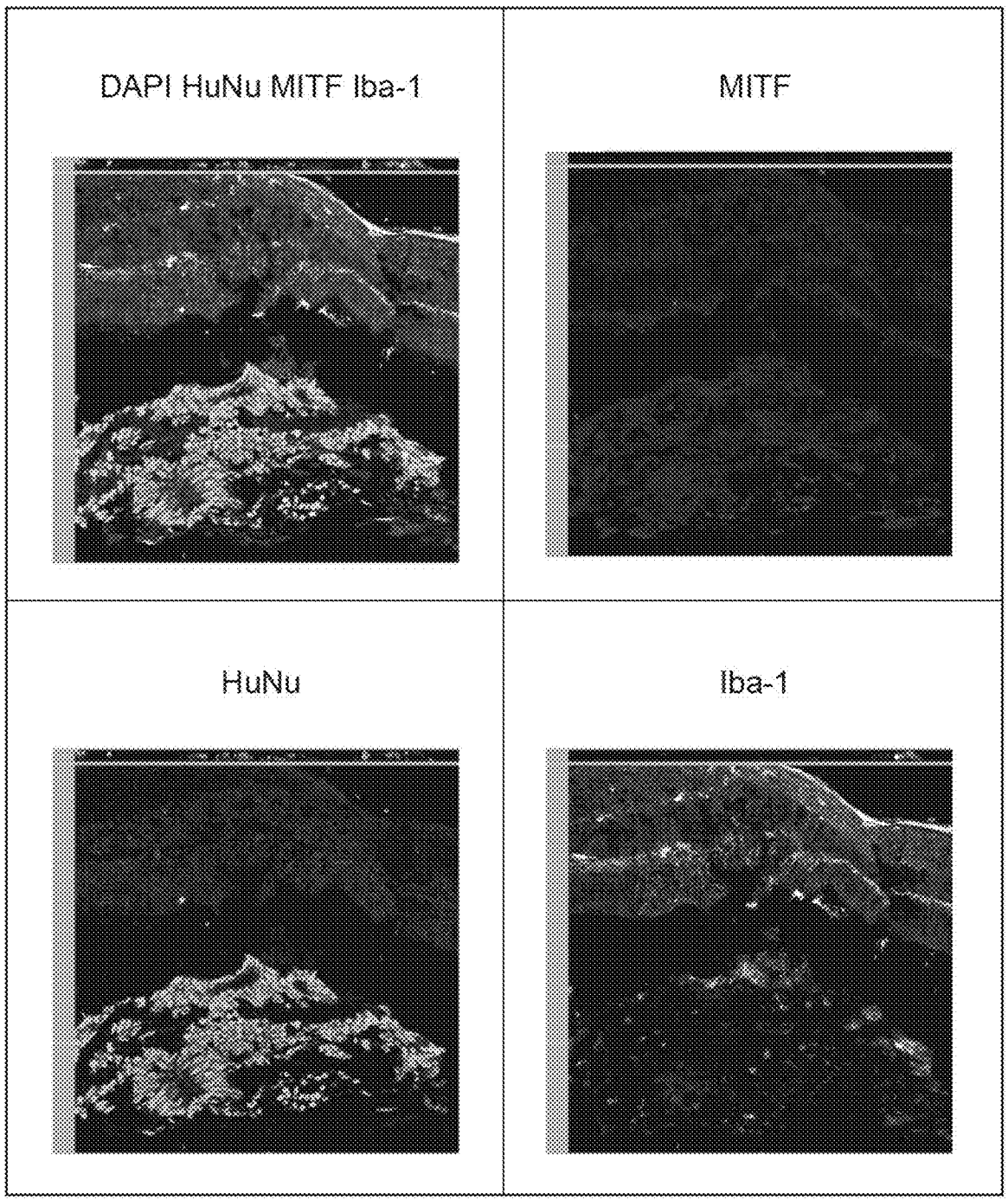
FIG. 20 is fluorescence microscope images showing results of performing immunostaining on human cells and RPE cells in tissue sections with DAPI, HuNu, MITF and Iba-1 in Example 8.

After the cooling, the RPE cell sheet and the neural retina were able to be recovered in a solid state. As a result of observation under a microscope, it was confirmed that the neural retina sat on the RPE cell sheet (FIGS. 10 and 11). After unnecessary gelatin around them was removed using a surgical knife or tweezers, gelatin that adhered to the glass slide was peeled and recovered using tweezers (FIG. 12). This composite of the human ES cell-derived RPE cell sheet and the neural retina was washed with PBS and further fixed using 4% PFA at 4° C. for 15 minutes. After washing with PBS, the composites were treated in a 30% sucrose/PBS solution. Thereafter, the composite was embedded in cryomold using OCT compound. A 12 µm cryosection was prepared using a cryostat. This section was observed under a confocal microscope (SP-8 manufactured by Leica Camera AG). As a result, it was found that the human ES cell-derived neural retina and the RPE cell sheet were separated from each other without contact through gelatin but were adjacent to each other (FIGS. 13 and 14). From this result, it was found that by two-stage embedding using gelatin, a RPE cell sheet and a neural retina separately obtained by differentiating human ES cells can be obtained in a condition in which they are separated from each other without contact through gelatin but are adjacent to each other.

Example 8 Transplantation and Confirmation of Engraftment of NR-RPE Cell Sheet

The composite of the human ES cell-derived RPE cell sheet and the neural retina embedded by gelatin, which was prepared by the method of Example 7, was slitted using a surgical knife and scissors so as to be aspirated into a transplantation needle. The slitted composite sheet was aspirated using a glass capillary and transplanted into subretinal space of a nude rat. For the transplantation, an incision was made in a portion of the eyeball, and the sheet was transplanted into subretinal space by inserting the glass capillary into the vitreous body through the incision site. One week after the transplantation, the eye was harvested, and fixed using paraformaldehyde, and subjected to sucrose replacement. 12 µm tissue sections were prepared using a cryostat. The sections were subjected to immunostaining using each of a human cytoplasm marker-specific mouse monoclonal antibody (trade name: Stem121, manufactured by Takara Bio Inc.), an anti-RPE65 antibody (trade name: RPE65 Antibody, manufactured by Merck Millipore), an anti-HuNu antibody (manufactured by Merck Millipore), an anti-MITF antibody (manufactured by Exalpha Biologicals Inc.), and an anti-Iba1 antibody (manufactured by FUJIFILM Wako Pure Chemical Corp.) to stain human cells and RPE cells in the tissue sections. The grafts after the transplantation were evaluated. Whether or not to be transplanted human-derived cells was determined by staining human cells.

The immunostained tissues were fluorescently observed using a confocal microscope (trade name: TCS SP8, manufactured by Leica Camera AG). The results are shown in FIGS. 15 to 20. As a result of observing the sections stained with Stem121 and RPE65, transplanted RPE cells derived from the graft and CRX::Venus-positive photoreceptor cell rosettes immediately thereabove were observed. From this result, it was found that in the simultaneous NR-RPE cell sheet transplantation, NR and RPE cells are capable of being simultaneously transplanted and engrafted with orientation.

Example 9 One-Stage Embedding of Human ES Cell-Derived RPE Sheet and Human ES Cell-Derived Neural Retina in 30% by Weight of Gelatin L-SW A human ES cell-derived neural retina and a RPE cell sheet of Days 80 to 150 from initiation of suspension culture produced in the same manner as in Example 1 were provided. The produced human ES cell-derived RPE cell sheet was isolated from the collagen gel using collagenase, thoroughly washed, and then placed on a 60 mm dish (Sumitomo Bakelite Co., Ltd.). Ten human ES cell-derived neural retinas were dissected using ophthalmic scissors and placed on the RPE cell sheet. 20 to 30 uL of 30% by weight of gelatin LS-W (manufactured by Nitta Gelatin Inc.) heated to 37° C. was added dropwise thereto from above, and the positional relationship between the neural retina and RPE were adjusted using tweezers, followed by cooling at 4° C. for 30 minutes.

Figure 21:
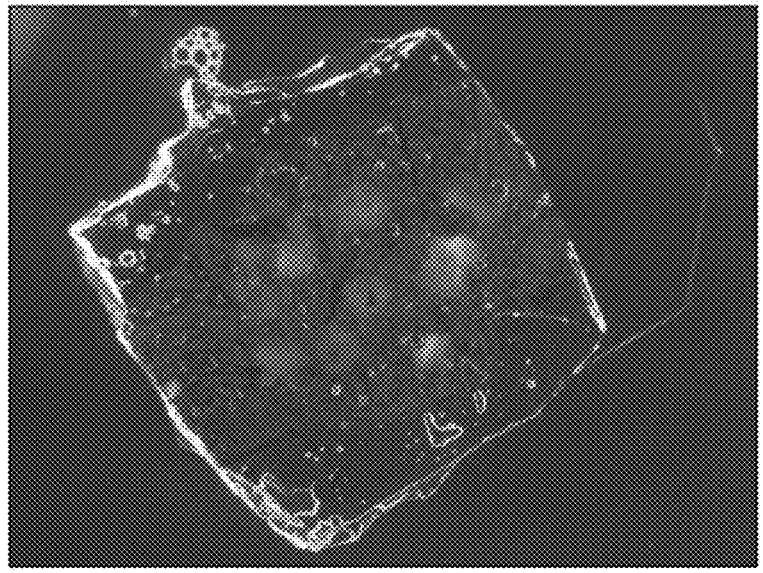
FIG. 21 is a microscope image showing that NR sits on a RPE cell sheet (A) and a fluorescence microscope image showing the fluorescence of CRX::Venus (B) in Example 9.
Figure 21:
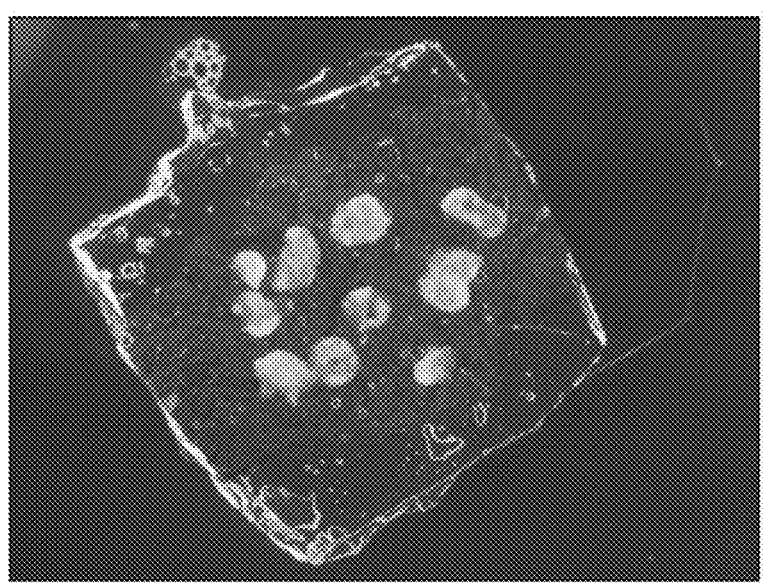

After the cooling, the RPE cell sheet and the neural retina were able to be recovered in a solid state by resecting redundant portions around them using a surgical knife. As a result of observation under a microscope, it was confirmed that NR was placed on the RPE cell sheet (FIG. 21). FIG. 21 (A) shows a microscope image, and FIG. 21 (B) shows a fluorescence microscope image showing the fluorescence of CRX::Venus. From this result, it was found that a RPE cell sheet and a neural retina separately obtained by differentiating human ES cells can be embedded in one stage using gelatin. In the case of one-stage embedding, the neural retina and the RPE cell sheet were also obtained in some cases in a condition in which they were separated from each other without contact through gelatin but were adjacent to each other.

INDUSTRIAL APPLICABILITY

The present invention can provide a composite of a neural retina and retinal pigment epithelial cells suitable for transplantation and a method for producing the same.

The invention claimed is:

1. A composite comprising a neural retina, a retinal pigment epithelial cell sheet, and a hydrogel, wherein
the neural retina and the retinal pigment epithelial cell sheet are derived from a human pluripotent stem cell respectively;
in the neural retina, a neural retinal layer including at least a photoreceptor layer is formed, wherein the photoreceptor layer comprises at least one or more cells selected from the group consisting of a photoreceptor cell, a photoreceptor precursor cell and a retinal precursor cell;
a melting point of the hydrogel is from 20° C. to 40° C.; and
the whole of the neural retina and the retinal pigment epithelial cell sheet is embedded in the hydrogel, tangent directions of the respective surfaces of the neural retina and the retinal pigment epithelial cell sheet are approximately parallel, an apical surface of the neural retina and an apical surface of the retinal pigment epithelial cell sheet face each other, and the neural retina and the retinal pigment epithelial cell sheet are separated by the hydrogel from each other without contact.

2. The composite according to claim 1, wherein a jelly strength of the hydrogel is from 1000 g to 2000 g.

3. The composite according to claim 1, wherein a concentration of the hydrogel is from 10% to 50% by weight.

4. The composite according to claim 1, wherein a pH of the hydrogel is from 6.5 to 7.5.

5. The composite according to claim 1, wherein the hydrogel has biodegradability.

6. The composite according to claim 1, wherein the hydrogel is a hydrogel of gelatin.

7. The composite according to claim 6, wherein the gelatin is alkali-treated and/or heat-treated gelatin.

8. The composite according to claim 1, wherein
the neural retina is a neural retina obtained from a cell aggregate obtained by differentiating a human pluripotent stem cell,
the cell aggregate comprises at least a first epithelial tissue and a second epithelial tissue, wherein the first epithelial tissue contains a human neural retina, and the second epithelial tissue has continuity of a slope of a tangent line to a surface different from continuity of a slope of a tangent line to the surface of the first epithelial tissue, and contains a cell other than a retinal cell and/or a retinal pigment epithelial cell, and
the neural retina contains a region on the first epithelial tissue most distant from the second epithelial tissue in the cell aggregate.

9. A pharmaceutical composition comprising the composite according to claim 1 as an active ingredient.

10. A therapeutic medication for a disease caused by a disorder of a retinal tissue or a damage of a retinal tissue, comprising the composite according to claim 1.

11. A composition for transplantation comprising the composite according to claim 1.

12. The composition for transplantation according to claim 11, wherein the composition for transplantation is to be transplanted to the eye fundus or into the subretinal space in a patient.

13. The composition for transplantation according to claim 12, wherein the composition for transplantation is to be transplanted such that the composite is engrafted in a recipient patient in a condition in which the neural retina of the transplanted composite faces the neural retinal layer of the patient while the retinal pigment epithelial cell sheet of the transplanted composite faces the retinal pigment epithelial layer of the patient.

14. A method for treating a disease caused by a disorder of a retinal tissue or a damage of a retinal tissue, comprising the steps of:
(1) transplanting the composite according to claim 1 to the eye fundus or into the subretinal space in a patient; and
(2) engrafting the composite in vivo in the patient in a condition in which the neural retina of the transplanted composite faces the neural retinal layer of the patient while the retinal pigment epithelial cell sheet of the transplanted composite faces the retinal pigment epithelial layer of the patient.

* * * * *